United States Patent
Wagner

(10) Patent No.: US 11,602,967 B2
(45) Date of Patent: Mar. 14, 2023

(54) INDEPENDENT SUSPENSION SYSTEM FOR A LEANING VEHICLE

(71) Applicant: Mark Wagner, Harrisburg, NC (US)

(72) Inventor: Mark Wagner, Harrisburg, NC (US)

(*) Notice: Subject to any disclaimer, the term of this patent is extended or adjusted under 35 U.S.C. 154(b) by 0 days.

(21) Appl. No.: 17/243,093

(22) Filed: Apr. 28, 2021

(65) Prior Publication Data
US 2021/0245562 A1 Aug. 12, 2021

Related U.S. Application Data

(63) Continuation of application No. 16/847,606, filed on Apr. 13, 2020, now abandoned.
(Continued)

(51) Int. Cl.
*B60G 3/20* (2006.01)
*B60G 3/26* (2006.01)
(Continued)

(52) U.S. Cl.
CPC ........ *B60G 3/265* (2013.01); *B60G 2200/144* (2013.01); *B60G 2206/82* (2013.01); *B60G 2300/124* (2013.01)

(58) Field of Classification Search
CPC ... B60G 3/18; B60G 3/20; B60G 3/26; B60G 3/265; B60G 2300/122; B60G 2300/124;
(Continued)

(56) References Cited

U.S. PATENT DOCUMENTS

| 4,717,164 A | 1/1988 | Levavi |
| 4,854,603 A | 8/1989 | Scaduto |

(Continued)

FOREIGN PATENT DOCUMENTS

| EP | 0827851 B1 | 10/2004 | |
| FR | 3010042 A1 * | 3/2015 | ............... B60G 3/20 |
| GB | 2476877 A | 7/2011 | |

*Primary Examiner* — James A English
*Assistant Examiner* — Daniel M. Keck
(74) *Attorney, Agent, or Firm* — Ditthavong, Steiner & Mlotkowski

(57) ABSTRACT

A suspension for a leaning vehicle having a central frame, the central frame having a first longitudinal axis. The suspension includes a carrier assembly pivotably attached about a second longitudinal axis to the frame, the carrier assembly including a carrier body; a first spring and damper assembly pivotably mounted to a first side of the carrier body at a first end thereof; a second spring and damper assembly pivotably mounted to a second side of the carrier body at a first end thereof; a first bellcrank pivotably mounted to a first side of the carrier body at a second end thereof, the second end of the first spring and damper assembly also mounted to the first bellcrank; and a second bellcrank pivotably mounted to a second side of the carrier body at a second end thereof, the second end of the second spring and damper assembly also mounted to the second bellcrank; wherein the first and second bellcranks are pivoted about their attaching axes when the spring and damper assemblies are compressed; a pair of first upper connecting components; a pair of first lower connecting components; and a first suspension travel link and a second suspension travel link.

25 Claims, 21 Drawing Sheets

Related U.S. Application Data

(60) Provisional application No. 62/833,687, filed on Apr. 13, 2019.

(51) Int. Cl.
  *B62K 5/01* (2013.01)
  *B62K 5/08* (2006.01)
  *B62K 5/10* (2013.01)

(58) Field of Classification Search
  CPC .......... B60G 2206/82; B60G 2200/144; B60G 2200/1442; B60G 2300/45
  See application file for complete search history.

(56) References Cited

U.S. PATENT DOCUMENTS

| | | |
|---|---|---|
| 6,695,329 B2 | 2/2004 | Handa |
| 6,805,218 B2 | 10/2004 | Wakitani et al. |
| 6,805,362 B1 | 10/2004 | Melcher |
| 7,591,337 B2 | 9/2009 | Suhre et al. |
| 7,648,148 B1 * | 1/2010 | Mercier .................. B62K 5/05 280/5.509 |
| 7,731,210 B2 | 6/2010 | Pedersen |
| 7,931,286 B2 | 4/2011 | Melcher |
| 8,360,440 B2 | 1/2013 | Mercier |
| 8,480,106 B1 | 7/2013 | Cohen |
| 8,789,639 B2 | 7/2014 | Mimura |
| 9,248,857 B2 | 2/2016 | Spahl et al. |
| 9,493,208 B2 | 11/2016 | Sasaki et al. |
| 9,834,271 B1 | 12/2017 | Hsing |
| 2006/0279058 A1 | 12/2006 | Padginton et al. |
| 2008/0012262 A1 | 1/2008 | Carabelli et al. |

* cited by examiner

INDEPENDENT SUSPENSION SYSTEM FOR A LEANING VEHICLE

RELATED APPLICATIONS

The present application is a continuation of U.S. Ser. No. 16/847,606, filed on Apr. 13, 2020, and is related to U.S. Ser. No. 62/833,687, filed on Apr. 13, 2019, the contents of each are hereby incorporated by reference in the entirety.

FIELD

The present disclosure relates to a suspension system for a leaning vehicle with at least three wheels resting on the ground, at least two of which are arranged on either side of the center of gravity with respect to the longitudinal axis of the vehicle. In particular, the present disclosure relates to independent suspension systems wherein at least one of the wheels is directionally controllable about an approximately vertical axis.

BACKGROUND

In the design of vehicles, a variety of technologies have been developed to allow a vehicle with more than two wheels to lean about a longitudinal axis of the vehicle with respect to the ground plane. In some cases, the vehicle allows independent wheel suspension travel regardless of the lean, but in other cases the suspension travel and lean are linked together.

In some designs, the leaning action is directly controlled by an actuator of any type in response to a steering input by the rider through any combination of control linkages, mechanisms, electronics, or hydraulics. In some designs, the leaning action is not directly controlled, but passively reacted against by any combination of mechanical or electronic mechanisms to help restore the vehicle from its leaned position to an upright position during travel along a straight path parallel to the longitudinal axis of the vehicle. In other designs, the tilting action is not directly controlled, and the functionality depends on the rider to maintain and control the upright or leaned position.

Despite these advances in the art, what is needed is a suspension system for a leaning vehicle that allows the rider control over it in the same manner as that of a two-wheeled vehicle, or motorcycle, with the exception that the vehicle herein described has the stability, traction, and safety of a vehicle with at least three wheels.

SUMMARY

Disclosed herein is a suspension system for a leaning vehicle, which allows the rider control over it in the same manner as that of a two-wheeled vehicle, or motorcycle, with the exception that the vehicle herein described has the stability, traction, and safety of a vehicle with at least three wheels.

In one aspect, provided is a suspension for a leaning vehicle having a central frame, the central frame having a first longitudinal axis. The suspension includes a carrier assembly pivotably attached about a second longitudinal axis to the frame, the carrier assembly including a carrier body; a first spring and damper assembly pivotably mounted to a first side of the carrier body at a first end thereof; a second spring and damper assembly pivotably mounted to a second side of the carrier body at a first end thereof; a first bellcrank pivotably mounted to a first side of the carrier body at a second end thereof, the second end of the first spring and damper assembly also mounted to the first bellcrank; and a second bellcrank pivotably mounted to a second side of the carrier body at a second end thereof, the second end of the second spring and damper assembly also mounted to the second bellcrank; wherein the first and second bellcranks are pivoted about their attaching axes when the spring and damper assemblies are compressed; a pair of first upper connecting components, each first upper connecting component having a first end and a second end, the first end connected to a first upper connecting axis link, the second end connected to a first upright at an upper end thereof, and a pair of second upper connecting components, each second upper connecting component having a first end and a second end, the first end connected to a second upper connecting axis link, the second end connected to a second upright at an upper end thereof; a pair of first lower connecting components, each first lower connecting component having a first end and a second end, the first end connected to a first lower connecting axis link, the second end connected to a first upright at an lower end thereof, and a pair of second lower connecting components, each second lower connecting component having a first end and a second end, the first end connected to a second lower connecting axis link, the second end connected to a second upright at an lower end thereof; a first suspension travel link having a first end and a second end, the first end connected to the first bellcrank and the second end connected to either the first upright, or the pair of first upper connecting components, or the pair of first lower connecting components, and a second suspension travel link having a first end and a second end, the first end connected to the second bellcrank and the second end connected to either the second upright, or the pair of second upper connecting components, or the pair of second lower connecting components.

In some embodiments, the suspension further includes a first steering link having a first end and a second end, the first end connected to a steering control assembly, the second end connected to a first upright, and a second steering link having a first end and a second end, the first end connected to a steering control assembly, the second end connected to a second upright.

In some embodiments, the first end of the first steering link, and the first end of the second steering link, are connected to the frame and the steering angle is fixed.

In some embodiments, the suspension further includes a first wheel, the first wheel mounted to the first wheel mounting component which is connected to the first upright, and a second wheel, the second wheel mounted to the second wheel mounting component which is connected to the second upright.

In some embodiments, an upward force is exerted on either the first or second wheel or both of the first and second wheels, the first and/or suspension travel link from the first and/or second wheel rotates the corresponding bellcrank and compresses the corresponding first and/or second spring and damper assembly, allowing independent suspension actuation regardless of the pivoted location of the carrier assembly about its pivotable axis.

In some embodiments, if the frame is leaned about an axis parallel to its longitudinal axis and the ground plane, both the first and second wheels will lean to remain approximately parallel to a center plane of the central frame.

In some embodiments, the first and second wheels are steerable or adjustable about an axis created by the points connecting the first and second wheels to the pairs of upper and lower connecting components.

In some embodiments, the pivoting of the carrier assembly and the lean of the frame and the first and second wheels are independent of the compression of the first and second spring and damper assemblies through the motion of the first and second bellcranks of the carrier assembly.

In some embodiments, the leaning vehicle can lean during cornering while not compressing the first and second spring and damper assemblies from the leaning action while maintaining independent suspension travel at each of the first and second wheels.

In some embodiments, the first and second bellcranks of the carrier assembly are connected to the first and second suspension travel links, respectively, such that the first and second suspension travel links are placed in tension when reacting to suspension loads from the first and second wheels.

In some embodiments, the first and second bellcranks of the carrier assembly are connected to the first and second suspension travel links, respectively, such that the first and second suspension travel links are placed in compression when reacting to suspension loads from the first and second wheels.

In some embodiments, the first and second wheels are steerable relative to a center-plane of the central frame by a vehicle operator to control the direction of the leaning vehicle.

In some embodiments, the first and second wheels are set at a fixed steering angle relative to a center-plane of the central frame by an adjustable link to maintain the directional stability of the leaning vehicle.

In some embodiments, the first and second wheels are positioned adjacent the front of the leaning vehicle, further comprising a third wheel positioned adjacent the rear of the vehicle.

In some embodiments, the first and second wheels are adjacent the rear of the vehicle, further comprising a third wheel adjacent the front of the vehicle.

In some embodiments, the suspension is located adjacent both the front and the rear of the vehicle.

In some embodiments, three or more suspensions are positioned in any location of the vehicle.

In some embodiments, at least one of the pairs of first upper connecting components, and/or pair of second upper connecting components, and/or pair of first lower connecting components, and/or pair of second lower connecting components are joined at their seconds to form unitary connecting components.

In another aspect, provided is a wheel mounting component for rotatably mounting the wheels of a leaning vehicle to its suspension components, wherein the axis about which the wheel mounting component can rotate relative to the frame is approximately parallel to the ground and perpendicular to the axis about which the upright can be steered or adjusted when a vehicle comprising the wheel mounting component is travelling along a straight path, and wherein the point at which a tire of the wheel contacts the ground is substantially rearward from the interception point of the axis about which the wheel mounting component can rotate and the ground with respect to the forward direction of motion of the vehicle when viewed from the side.

In some embodiments, the point at which the tire contacts the ground is coincident with the intersection point of the axis about which the upright can be steered or adjusted and the ground when viewed from the front of the leaning vehicle while it is travelling along a straight path.

In some embodiments, the point at which the tire contacts the ground is at a non-zero distance from the intersection point of the axis about which the upright can be steered or adjusted and the ground when viewed from the front of the vehicle while it is travelling along a straight path.

In yet another aspect, provided is a method of forming a suspension for a leaning vehicle having a central frame from a set of components, the central frame having a first longitudinal axis. The method includes the steps of providing a carrier assembly pivotably attached about a second longitudinal axis to the frame, the carrier assembly including a carrier body; a first spring and damper assembly pivotably mounted to a first side of the carrier body at a first end thereof; a second spring and damper assembly pivotably mounted to a second side of the carrier body at a first end thereof; a first bellcrank pivotably mounted to a first side of the carrier body at a second end thereof, the second end of the first spring and damper assembly also mounted to the first bellcrank and; a second bellcrank pivotably mounted to a second side of the carrier body at a second end thereof, the second end of the second spring and damper assembly also mounted to the second bellcrank; wherein when the first and second bellcranks are pivoted about their attaching axis the spring and damper assemblies are compressed; providing a pair of first upper connecting components, each first upper connecting component having a first end and a second end, the first end connected to a first upper connecting axis link, the second end connected to a first upright at an upper end thereof, and a pair of second upper connecting components, each second upper connecting component having a first end and a second end, the first end connected to a second upper connecting axis link, the second end connected to a second upright at an upper end thereof; providing a pair of first lower connecting components, each first lower connecting component having a first end and a second end, the first end connected to a first lower connecting axis link, the second end connected to a first upright at an lower end thereof, and a pair of second lower connecting components, each second lower connecting component having a first end and a second end, the first end connected to a second lower connecting axis link, the second end connected to a second upright at an lower end thereof; providing a first suspension travel link having a first end and a second end, the first end connected to the first bellcrank and the second end connected to either the first upright, or the pair of first upper connecting components, or the pair of first lower connecting components, and a second suspension travel link having a first end and a second end, the first end connected to the second bellcrank and the second end connected to either the second upright, or the pair of second upper connecting components, or the pair of second lower connecting components; and assembling the above to form the suspension for a leaning vehicle.

In some embodiments, the method includes the step of providing a first steering link having a first end and a second end, the first end connected to a steering control assembly, the second end connected to a first wheel mounting component, and a second steering link having a first end and a second end, the first end connected to a steering control assembly, the second end connected to a second wheel mounting component.

In some embodiments, the first and second bellcranks of the carrier assembly are connected to the first and second suspension travel links, respectively, such that the first and second suspension travel links are placed in tension when reacting to suspension loads.

In some embodiments, the first and second bellcranks of the carrier assembly are connected to the first and second suspension travel links, respectively, such that the first and second suspension travel links are placed in compression when reacting to suspension loads.

In still yet another aspect, provided is a carrier assembly for use in a suspension for a leaning vehicle having a central frame having a first longitudinal axis, the carrier assembly pivotably attached about a second longitudinal axis to the frame, the leaning vehicle structured and arranged to be driven by a rider, the carrier assembly including a carrier body, and further including a first spring and damper assembly pivotably mounted to a first side of the carrier body at a first end thereof; a second spring and damper assembly pivotably mounted to a second side of the carrier body at a first end thereof; a first bellcrank pivotably mounted to a first side of the carrier body at a second end thereof, the second end of the first spring and damper assembly also mounted to the first bellcrank; and a second bellcrank pivotably mounted to a second side of the carrier body at a second end thereof, the second end of the second spring and damper assembly also mounted to the second bellcrank; wherein the first and second bellcranks are pivoted about their attaching axes when the spring and damper assemblies are compressed.

DETAILED DESCRIPTION

FIGS. 1A-19 provide illustrative, non-exclusive examples of methods and suspensions for leaning vehicles, according to the present disclosure and/or of systems, apparatus, and/or assemblies that may include, be associated with, be operatively attached to, and/or utilize such suspensions. In FIGS. 1A-19, like numerals denote like, or similar, structures and/or features; and each of the illustrated structures and/or features may not be discussed in detail herein with reference to each of FIGS. 1A-19. Similarly, each structure and/or feature may not be explicitly labeled in each of FIGS. 1A-19; and any structure and/or feature that is discussed herein with reference to any one of FIGS. 1A-19 may be utilized with any other of FIGS. 1A-19 without departing from the scope of the present disclosure.

In general, structures and/or features that are, or are likely to be, included in each embodiment are indicated in solid lines in FIGS. 1A-19, while optional structures and/or features are indicated in broken lines. However, a given embodiment is not required to include all structures and/or features that are illustrated in solid lines therein, and any suitable number of such structures and/or features may be omitted from a given embodiment without departing from the scope of the present disclosure.

Figure 1A:
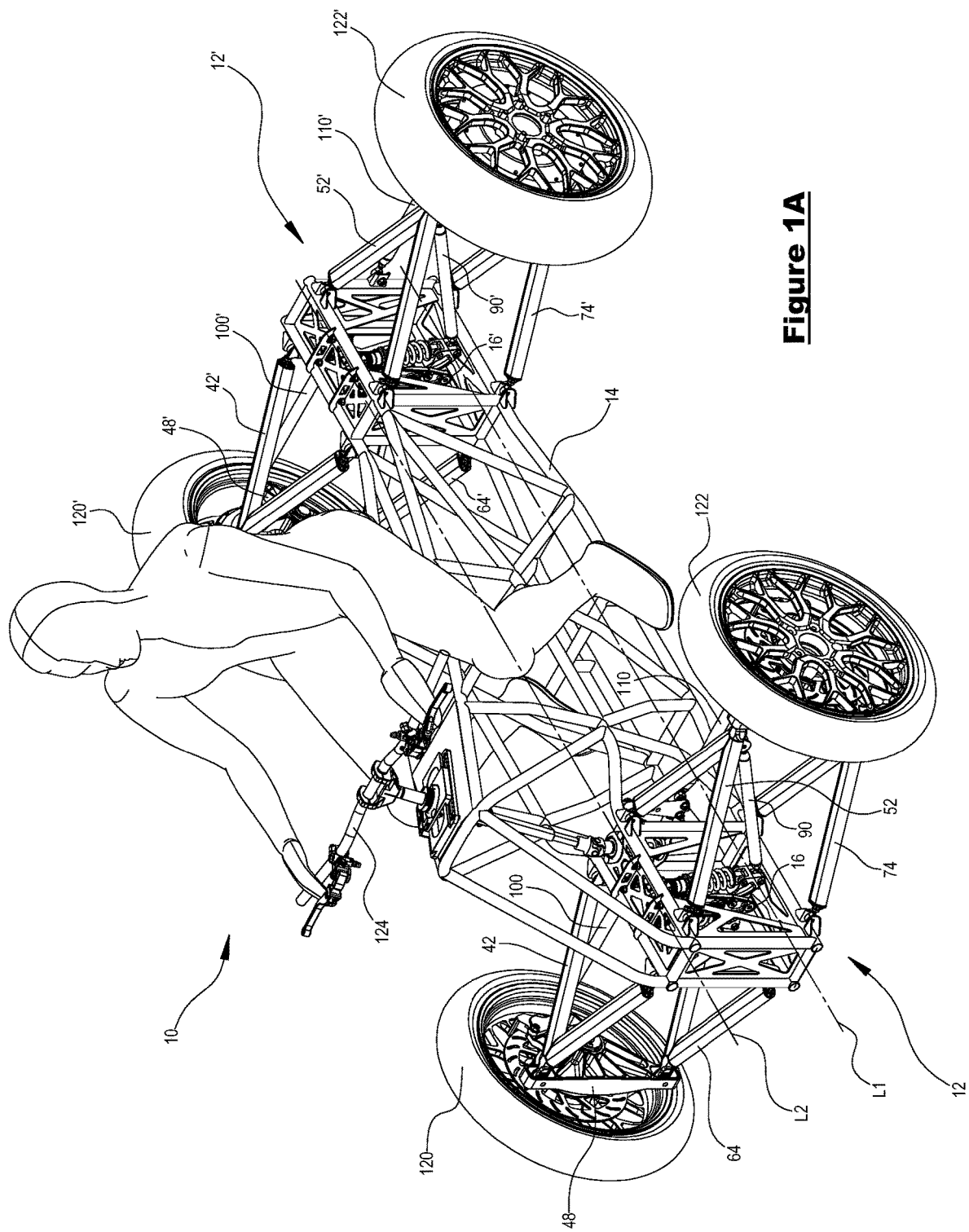
FIG. 1A is a perspective view of one embodiment of a leaning vehicle having a suspension in accordance herewith.
Figure 1B:
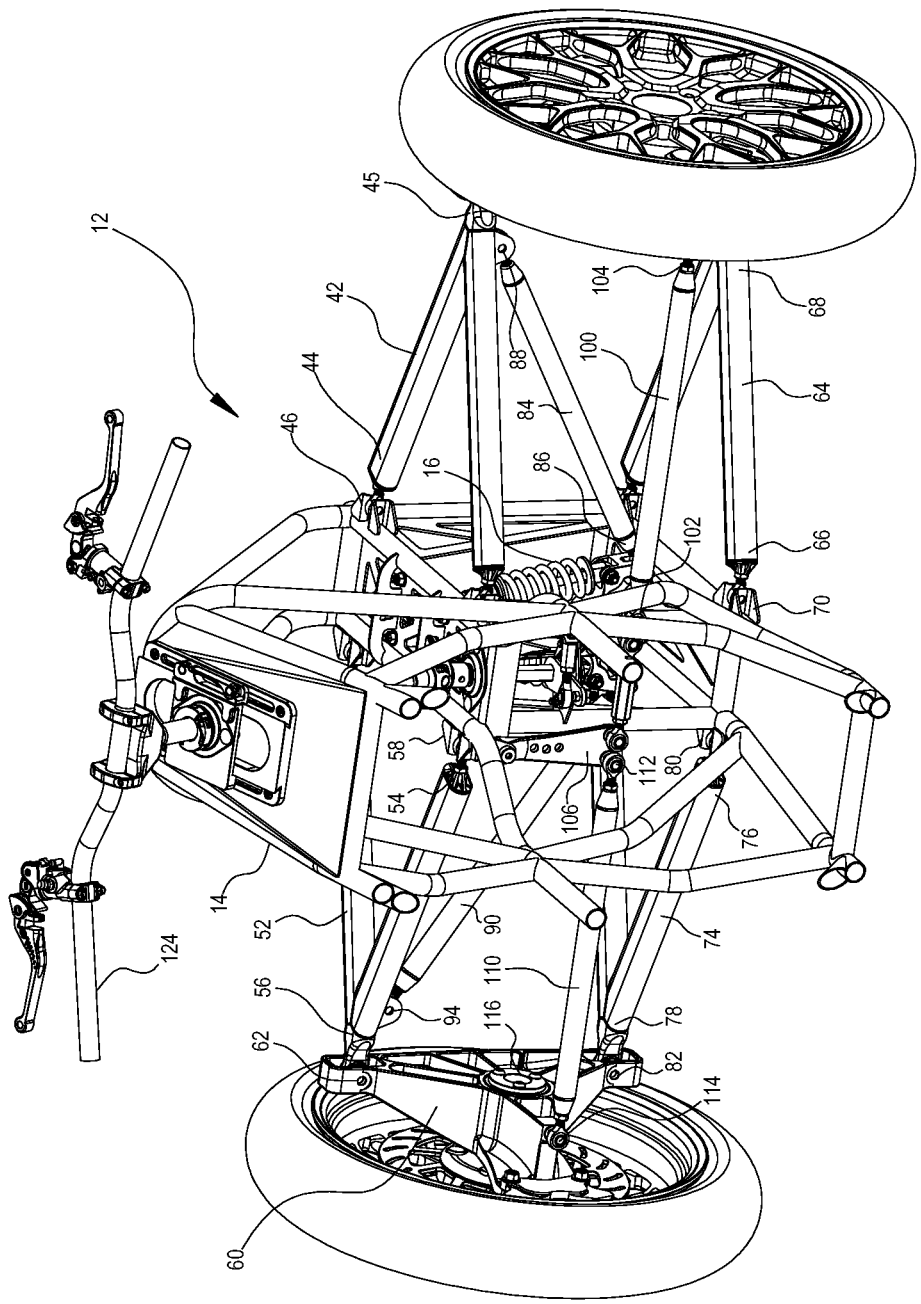
FIG. 1B is a perspective sectional view of the FIG. 1A embodiment of the front of a leaning vehicle having a suspension in accordance herewith.
Figure 1C:
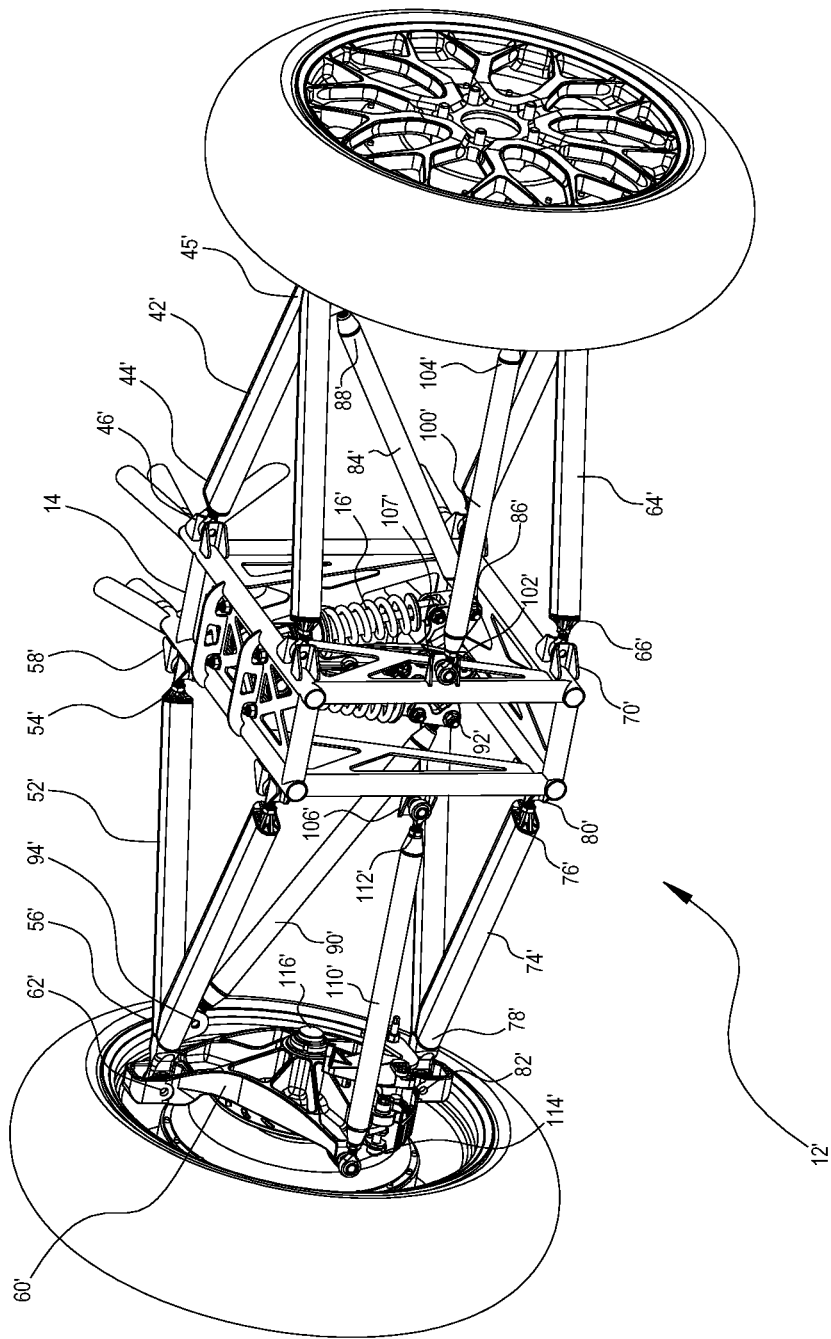
FIG. 1C is a perspective sectional view of the FIG. 1A embodiment of the rear of a leaning vehicle having a suspension in accordance herewith.

FIGS. 1A-11 present views of an embodiment of a leaning vehicle 10 having a front suspension 12 and, as shown in FIGS. 1A-1C, a rear suspension 12', in accordance herewith. Referring to FIGS. 1A-11, leaning vehicle 10 has a central frame 14, the central frame 14 having a first longitudinal axis L1. The suspensions 12 and 12' include carrier assemblies 16 and 16' pivotably attached about a second longitudinal axis L2 of the central frame 14.

The carrier assemblies 16 and 16' include carrier bodies 18 and 18'. (For more detail, see FIGS. 12 and 13). First spring and damper assemblies 20 and 20' are pivotably mounted to a first side 24 and 24' of each of the carrier bodies 18 and 18' at first ends 22 and 22'. Second spring and damper assemblies 26 and 26' are pivotably mounted to a second side 28 and 28' of each of the carrier bodies 18 and 18' at first ends 23 and 23'. First bellcranks 30 and 30' are pivotably mounted to first sides 24 and 24' of the carrier bodies 18 and 18' at second ends 32 and 32'. Second ends 34 and 34' of first spring and damper assemblies 20 and 20' are also mounted to first bellcranks 30 and 30'. Second bellcranks 36 and 36' are pivotably mounted to a second side 28 and 28' of the carrier bodies 18 and 18' at second end 38 and 38'. Second ends 40 and 40' of the second spring and damper assemblies 26 and 26' are also mounted to the second bellcranks 36 and 36'. As may be appreciated; when the first and second bellcranks, 30, 30' and 36 and 36', respectively, are pivoted about their attaching axes the spring and damper assemblies 20, 20' and 26, 26' are compressed.

Pairs of first upper connecting components 42 and 42' are provided, each first upper connecting component 42 and 42' having a first end 44 and 44' and a second end 45 and 45'. First ends 44 and 44' are connected to first pairs of upper connecting axis links 46 and 46'. Second ends 45 and 45' are connected to first uprights 48 and 48" at upper ends 50 and 50'. Pairs of second upper connecting components 52 and 52', each second upper connecting component 52 and 52' having a first end 54 and 54' and a second end 56 and 56'. The first ends 54 and 54' connected to second upper connecting axis links 58 and 58', the second ends 56 and 56' connected to second uprights 60 and 60' (see FIG. 2) at upper ends 62 and 62' (again, se FIG. 2).

Figure 2:
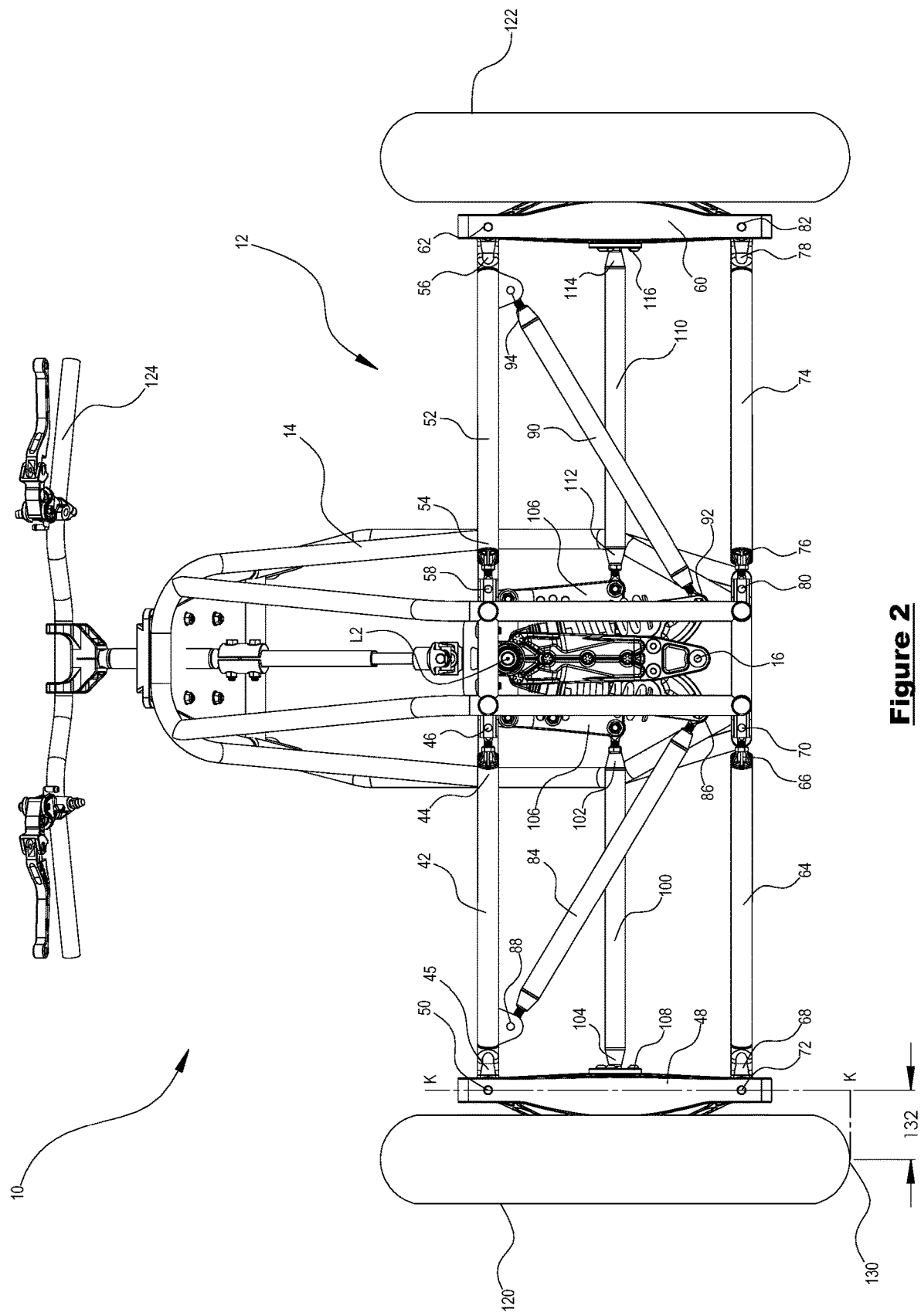
FIG. 2 is a front plan view of the FIG. 1A embodiment, in accordance herewith, the leaning vehicle presented in an upright position.
Figure 3:
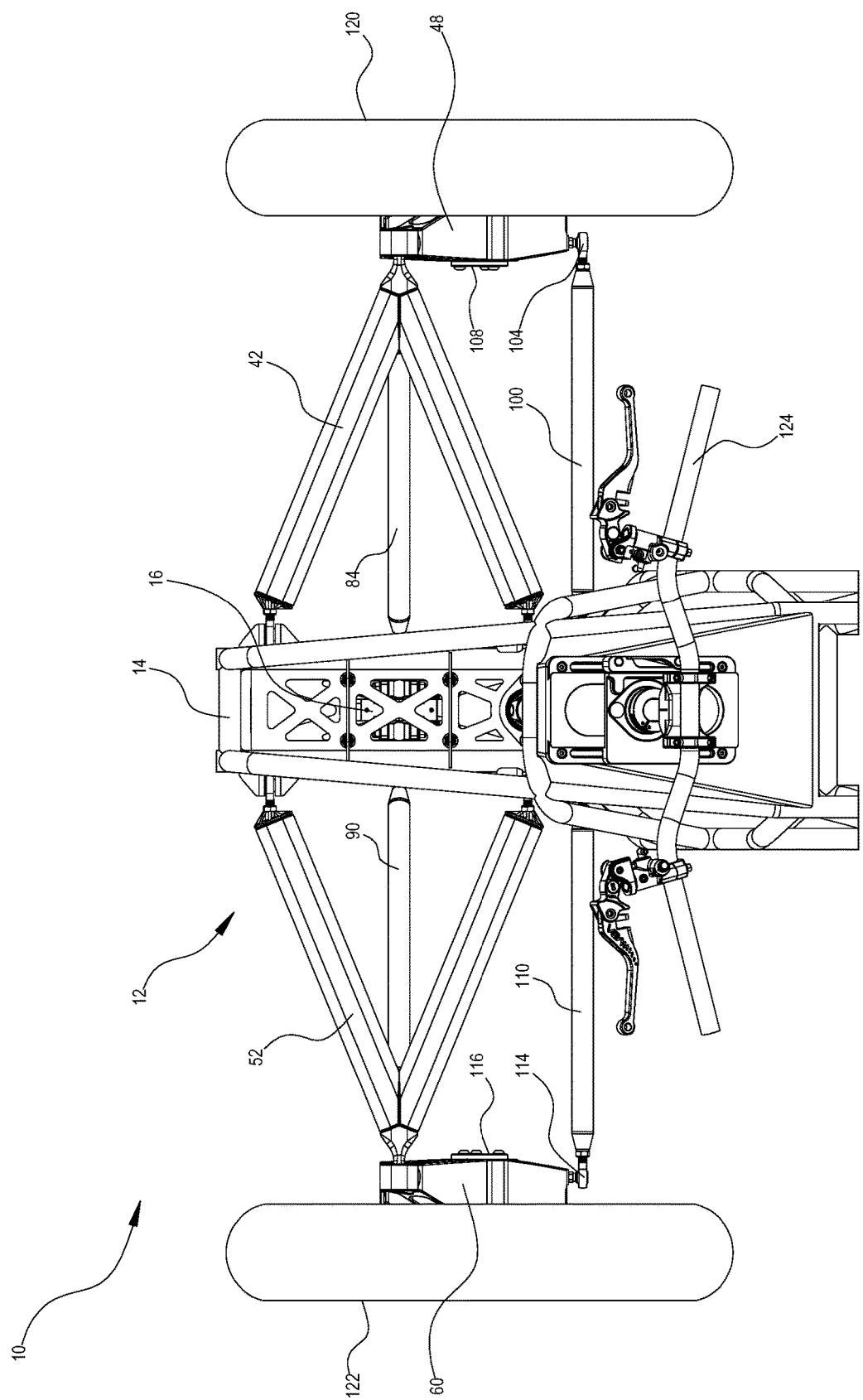
FIG. 3 is a top plan frontal view of the FIG. 1A embodiment, in accordance herewith, the leaning vehicle shown in an upright position while following a straight path.
Figure 4:
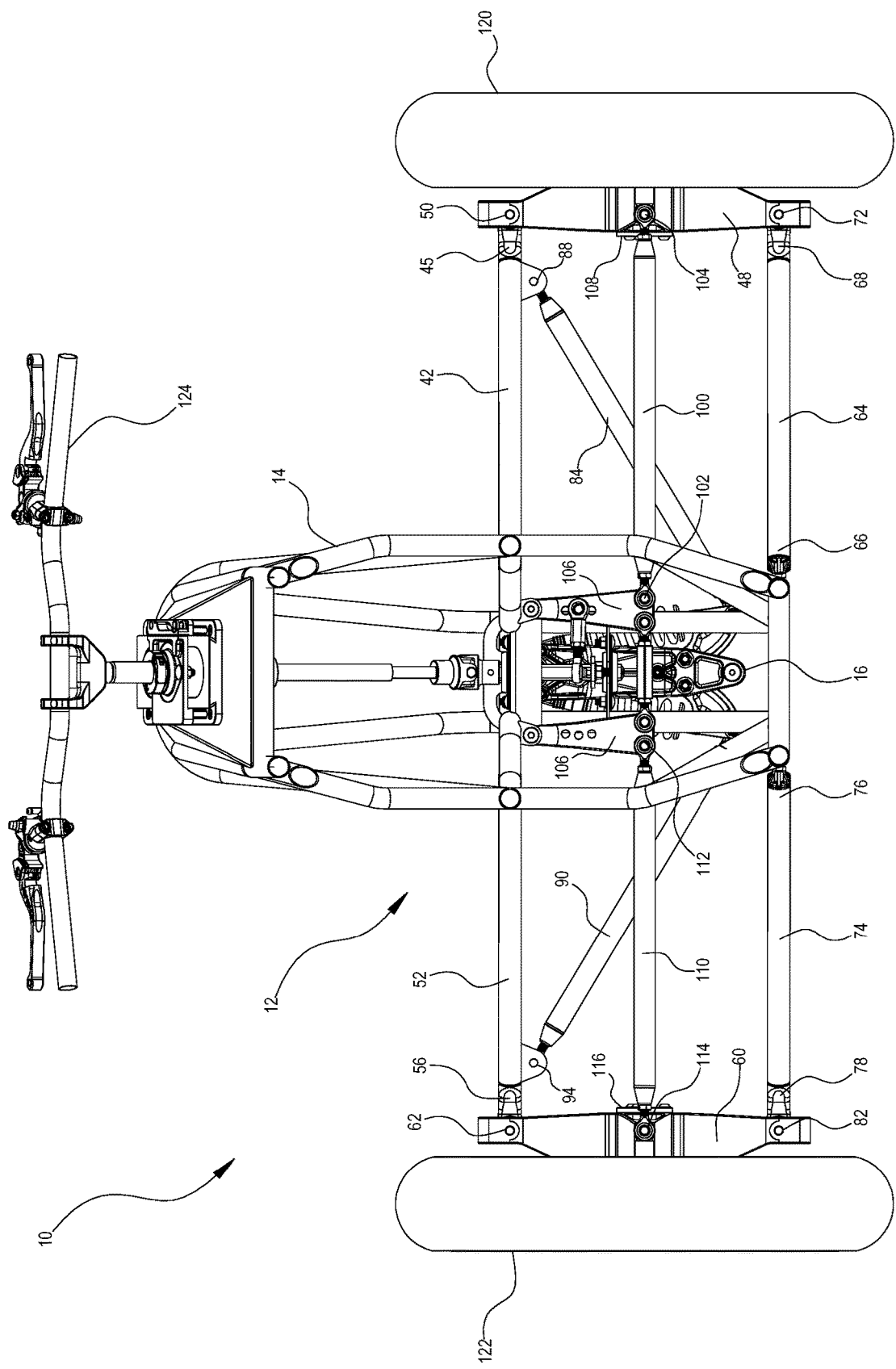
FIG. 4 is a rear plan sectional view of the FIG. 1A embodiment, in accordance herewith, the leaning vehicle shown in an upright position while following a straight path.
Figure 5:
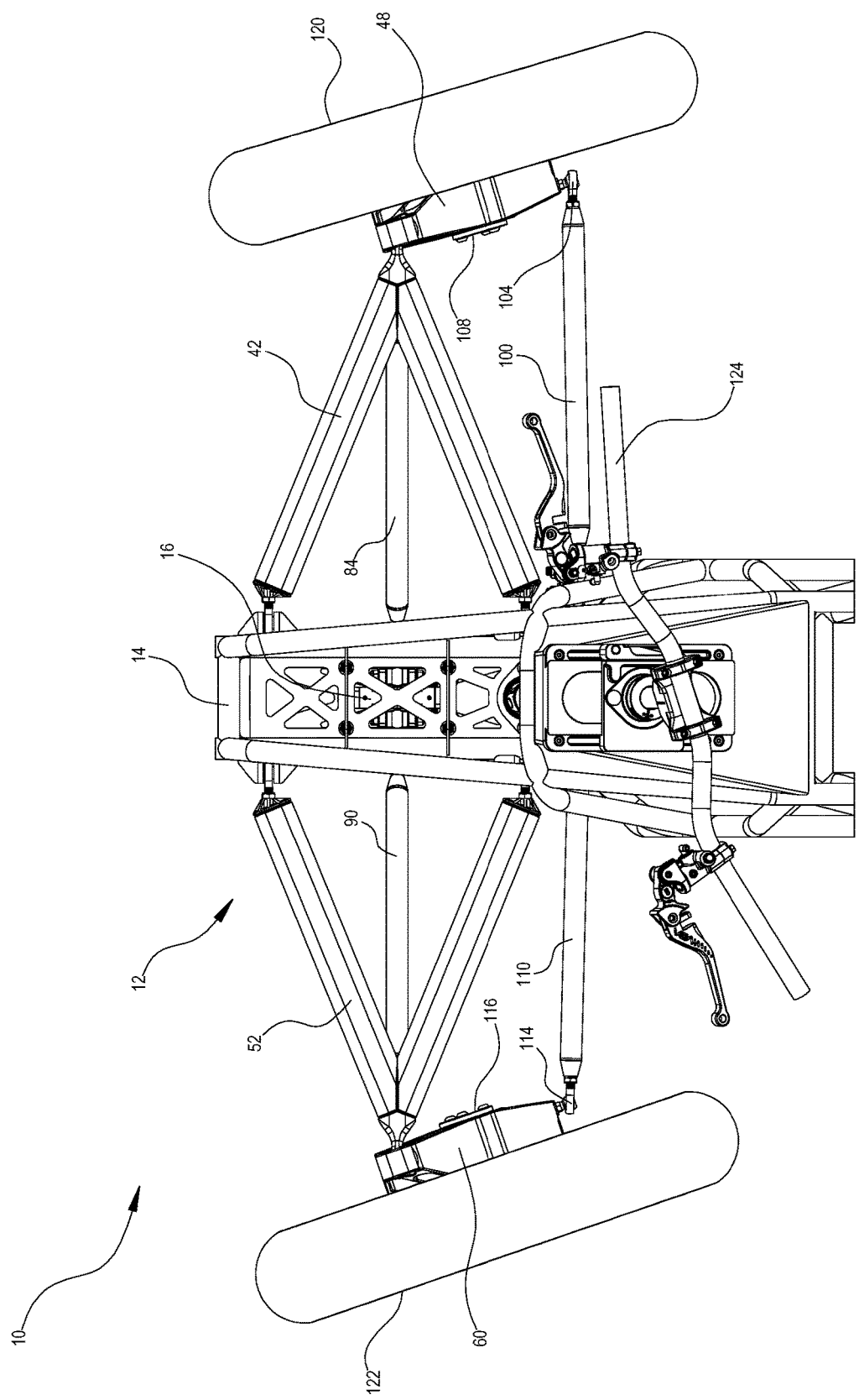
FIG. 5 is a top plan frontal view of the FIG. 1A embodiment, in accordance herewith, the leaning vehicle shown in an upright position while making a left turn in a non-leaning orientation.
Figure 6:
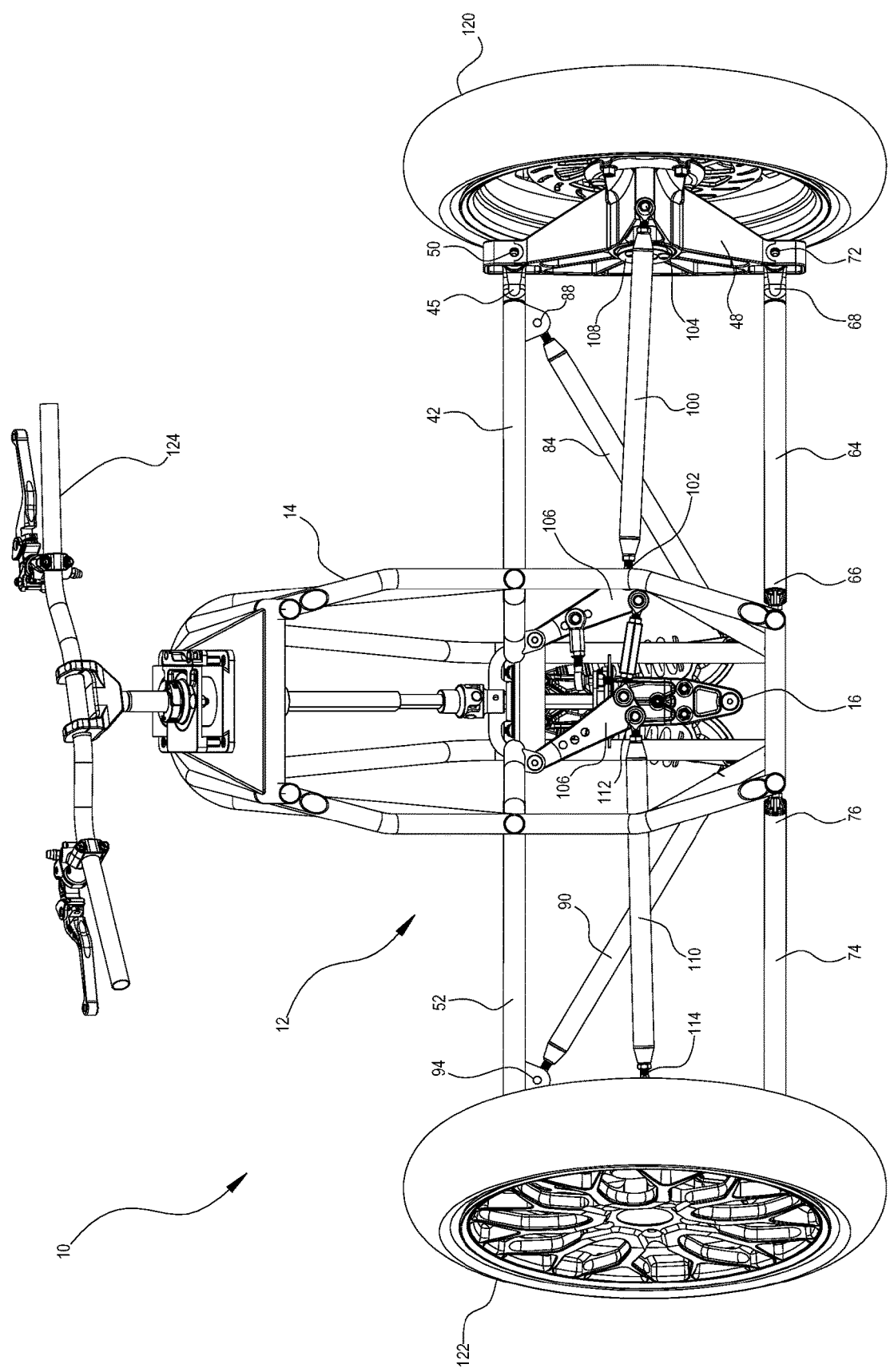
FIG. 6 is a rear plan sectional view of the FIG. 1A embodiment, in accordance herewith, the leaning vehicle shown in an upright position while making a left turn in a non-leaned orientation.

Still referring to FIGS. 1A-11, a pair of first lower connecting components 64 and 64', each first lower connecting component 64 and 64' having a first end 66 and 66' and a second end 68 and 68', first ends 66 and 66' are connected to first lower connecting axis links 70 and 70', the second ends 68 and 68' are connected to a first upright 48 and 48' at an lower end 72 and 72' (see also FIG. 2), and a pair of second lower connecting components 74 and 74', each second lower connecting component 74 and 74' having a first end 76 and 76' and a second end 78 and 78'(see FIG. 2). First ends 76 and 76' are connected to a second lower connecting axis link 80 and 80', the second ends 78 and 78' are connected to a second upright 60 and 60' at lower ends 82 and 82'.

First suspension travel links 84 and 84' each have first ends 86 and 86' and second ends 88 and 88'. First ends 86 and 86' are connected to the first bellcrank 30 and 30 'and the second ends 88 and 88' are connected to either the first uprights 48 and 48' (not shown) or the pair of first upper connecting components 42 and 42' (as shown), or the pair of first lower connecting components 64 and 64' (not shown). Second suspension travel links 90 and 90' each have a first end 92 and 92' and a second end 94 and 94', the first ends 92 and 92' connected to the second bellcrank 36 and 36' and the second ends 94 and 94' connected to either the second upright 60 and 60' (not shown), or the pair of second upper connecting components 52 and 52' (as shown), or the pair of second lower connecting components 74 and 74' (not shown).

As will be described by reference to FIGS. 1A-11, the front suspension of leaning vehicle 10 is adapted and configured to be steerable. In accordance with the embodiments of FIGS. 1A-11, a first steering link 100 is provided with a first end 102 and a second end 104, the first end 102 connected to a steering control assembly 106 and handlebar assembly 124, the second end 104 connected to a first upright 48. A second steering link 110 is provided with a first end 112 and a second end 114, the first end 112 connected to the steering control assembly 106, the second end 114 connected to a second upright 60. If the handlebar assembly 124 is turned along its mounting axis, the connected steering control assembly 106 causes first and second steering links 100 and 110 to rotate the uprights 48 and 60 about their mounting points to the connecting components, thereby effectively steering the wheels 120 and 122 relative to the central frame 14.

Referring primarily to FIGS. 1A-1C, front suspension 12 includes a first wheel 120. As shown, first wheel 120 is mounted to the first wheel mounting component 108. The first wheel mounting component 108 is connected to the first upright 48. A second wheel 122 is also provided, the second wheel 122 mounted to the second wheel mounting component 116. The second wheel mounting component is connected to the second upright 60. Rear suspension 12' includes a first wheel mounted 120'. First wheel 120' is mounted to the first wheel mounting component 108'. The first rear wheel mounting component 108' is attached to the first rear upright 48' A second wheel 122' is provided, the second wheel 122' mounted to the second wheel mounting component 116'. The second rear wheel mounting component 116' is attached to the second rear upright 60'.

In some embodiments, such as the one depicted in FIG. 1, the first and second rear wheels 120' and 122 may be constrained to remain approximately parallel to the centerplane of the leaning vehicle to maintain a direction of leaning vehicle. In accordance with FIG. 1, a first steering link 100' is provided with a first end 102' and a second end 104', the first end 102' connected to a first fixed mounting bracket axis 106', the second end 104' connected to a first upright 48'. A second steering link 110' is provided with a first end 112' and a second end 114', the first end 112' connected to a second fixed mounting bracket axis 107', the second end 114' connected to a second upright 60'.

Figure 7:
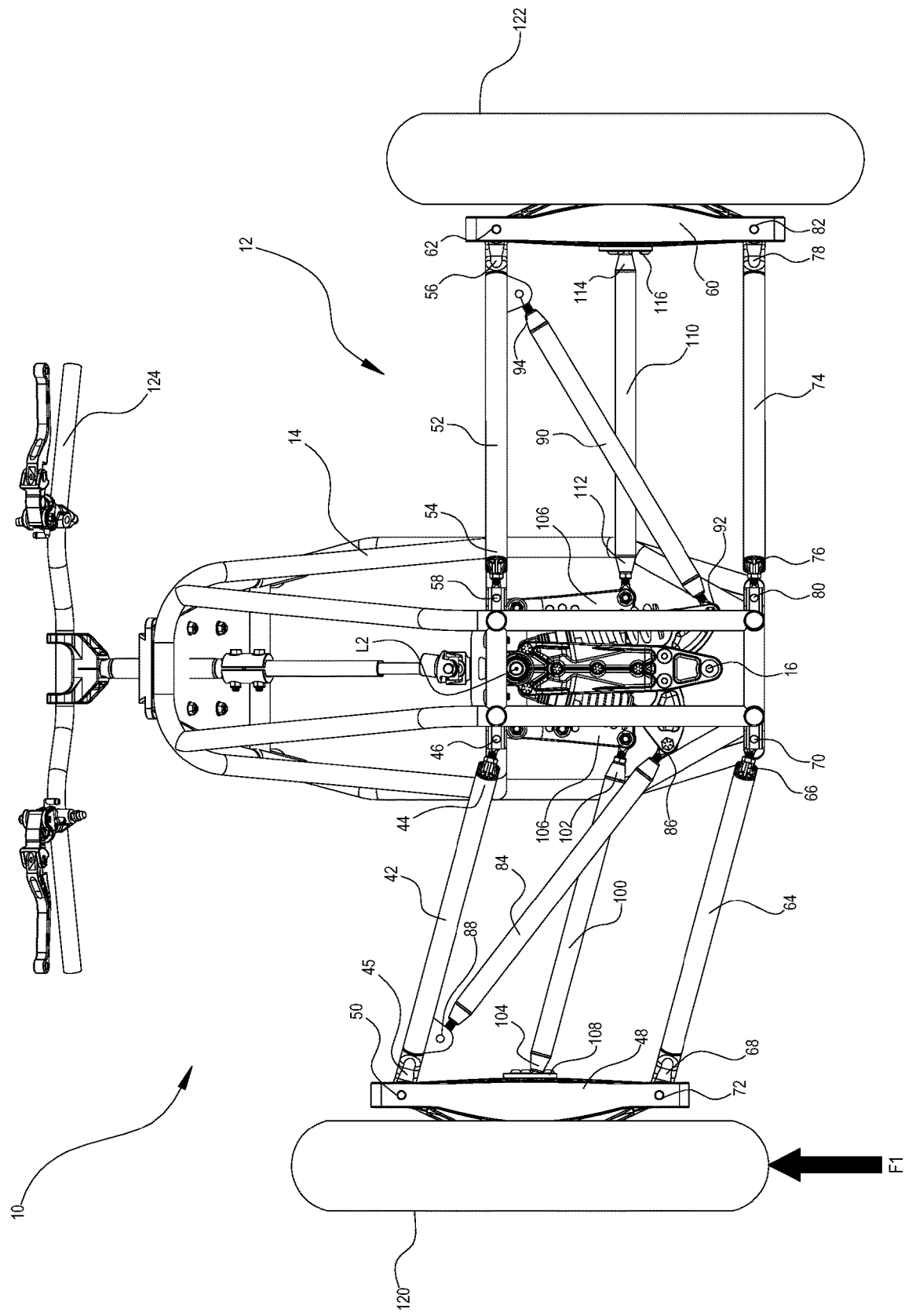
FIG. 7 is a front view of the FIG. 1A embodiment, in accordance herewith, the leaning vehicle shown in an upright position while the vehicle travels in a straight line and encounters an obstacle at the left wheel.
Figure 8:
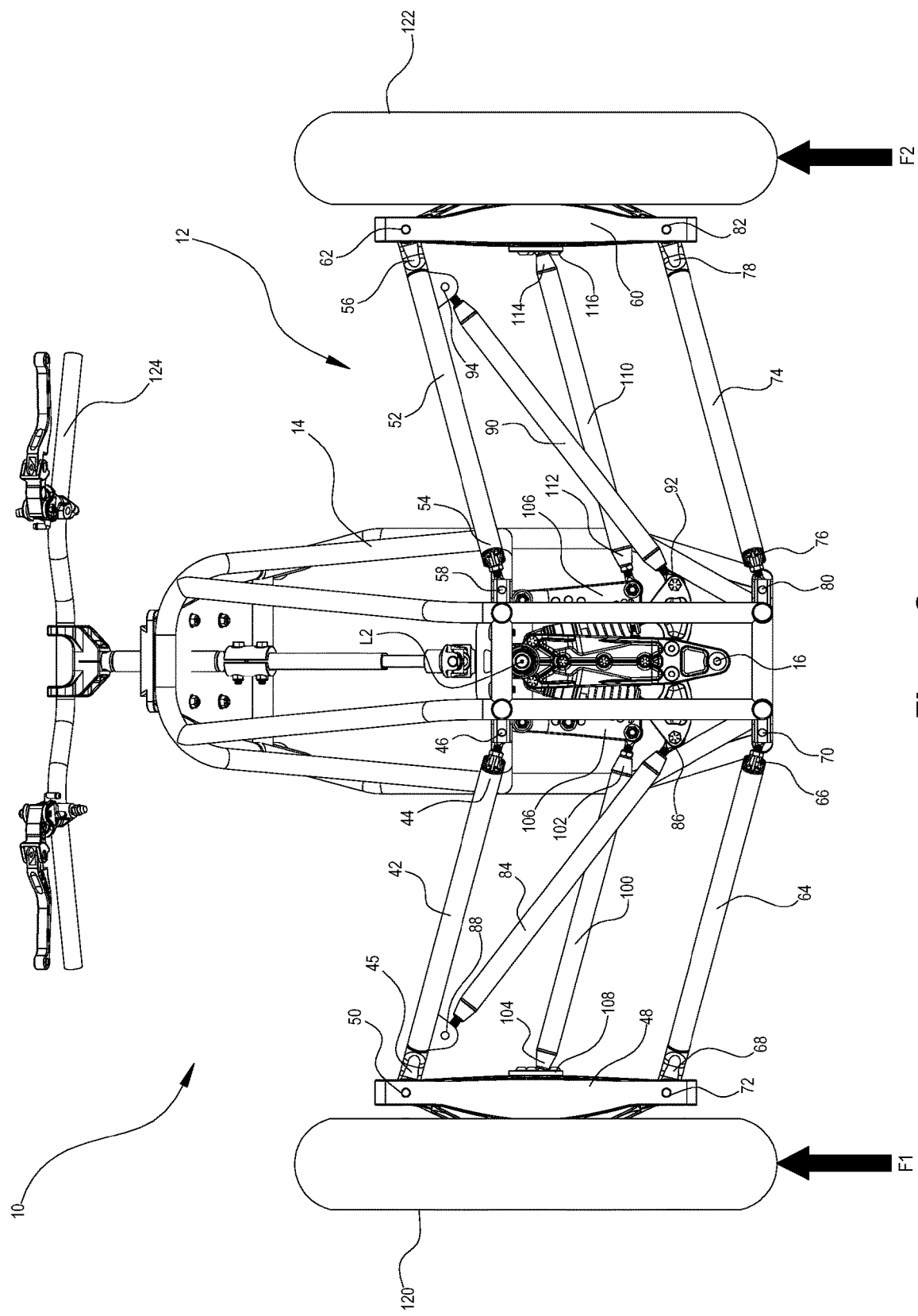
FIG. 8 is another front plan view of the FIG. 1A embodiment, in accordance herewith, the leaning vehicle shown in an upright position while the vehicle encounters an obstacle at both wheels.

Referring now to FIGS. 7 and 8, the independent nature of suspension 12 (and 12' of FIG. 1) will be described. When an upward force F1 or F2 is exerted on either the first wheel 120 or second wheel 122 (See FIGS. 7-8) or both the first wheel 120 and the second wheels 122, the first suspension travel link 84 and/or the second suspension travel link 90 from the first wheel 120 and/or the second wheel 122 rotates the corresponding bellcrank 30 and/or 36. The corresponding first spring and damper assembly 20 and/or second spring and damper assembly 26 are compressed, allowing independent actuation of suspension 12 regardless of the pivoted location of the carrier assembly 16 about its pivotable axis L2. Independent rear suspension 12' (see FIG. 1) is structured and arranged in a corresponding manner to operate similarly when encountering an upward force.

Still referring to FIGS. 7 and 8, the first and second bellcranks 30 and 36 of the carrier assembly 16 are connected to the first and second suspension travel links 84 and 90, respectively, such that the first and second suspension travel links 84 and 90 are placed in tension when reacting to suspension loads from the first and second wheels 120 and 122. Likewise, the first and second bellcranks 30 and 36 of the carrier assembly 16 can be connected to the first and second suspension travel links 84 and 90, respectively, such that the first and second suspension travel links 84 and 90 are placed in compression when reacting to suspension loads from the first and second wheels 120 and 122 (not shown).

Figure 9:
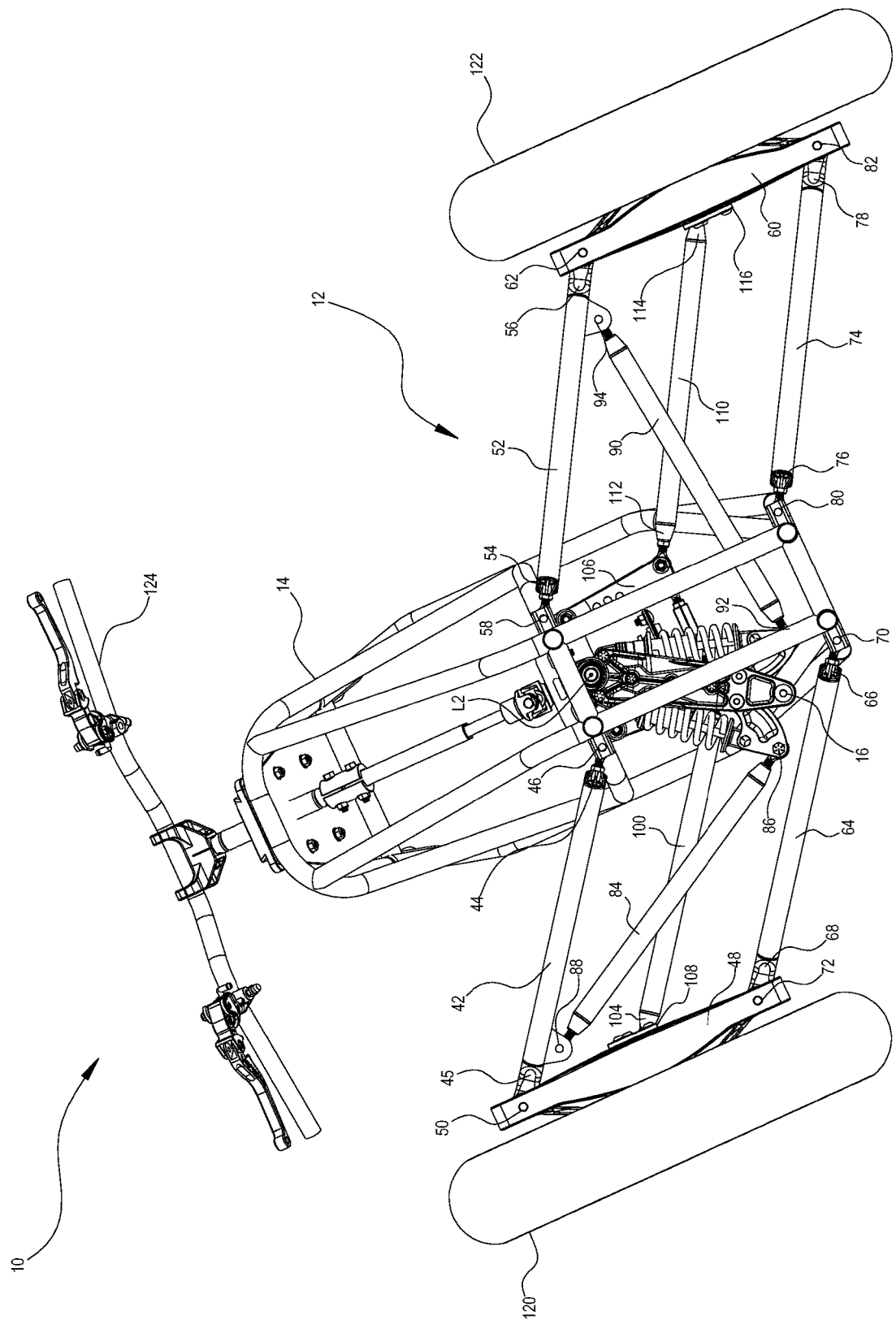
FIG. 9 is a front view of the FIG. 1A embodiment, in accordance herewith, the leaning vehicle shown in a leaning position while following a curved path at a steady state.
Figure 10:
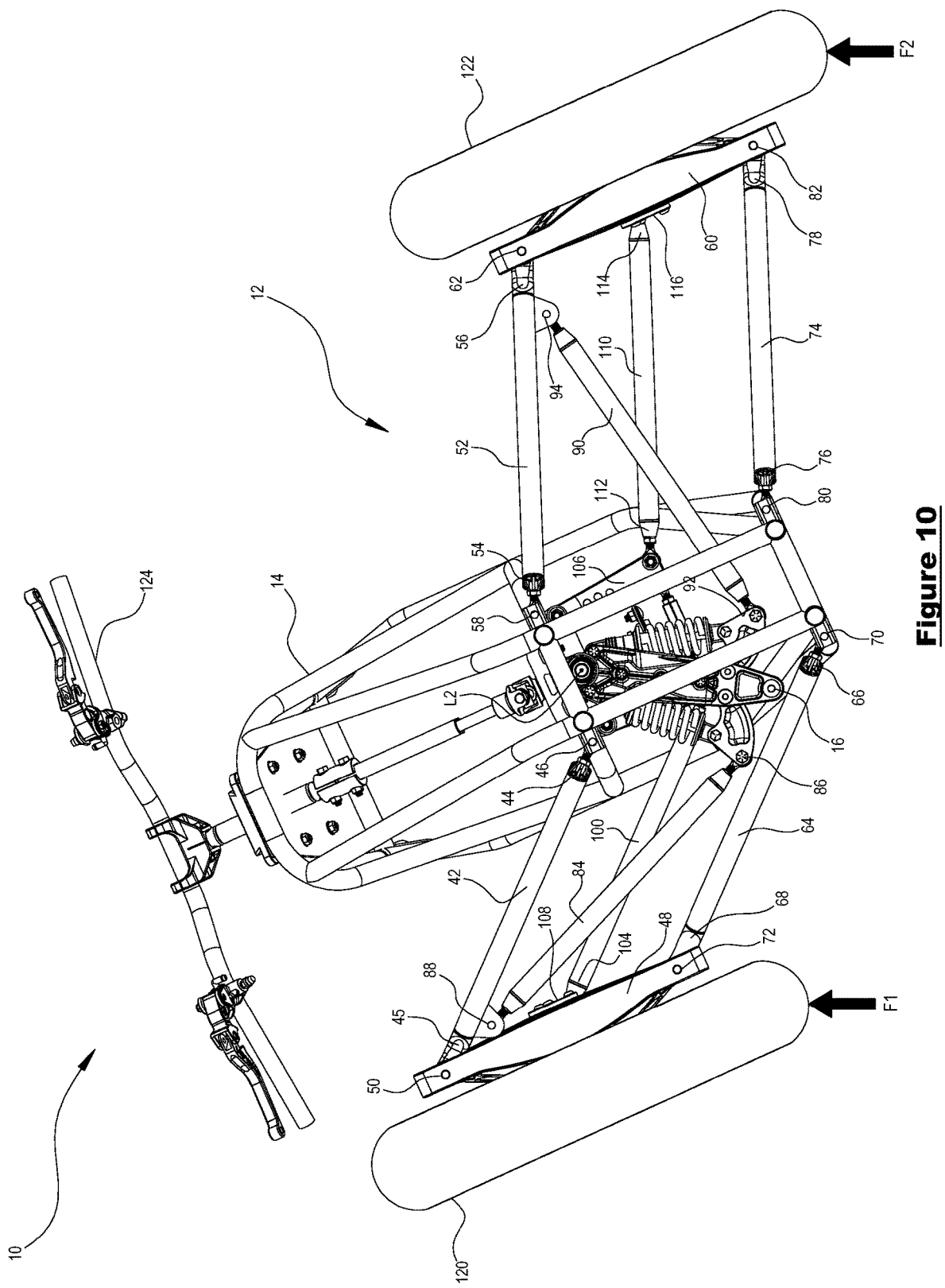
FIG. 10 is a front view of the FIG. 1A embodiment, in accordance herewith, the leaning vehicle shown in a leaning position while following a curved path and encountering an obstacle at both wheels.
Figure 11:
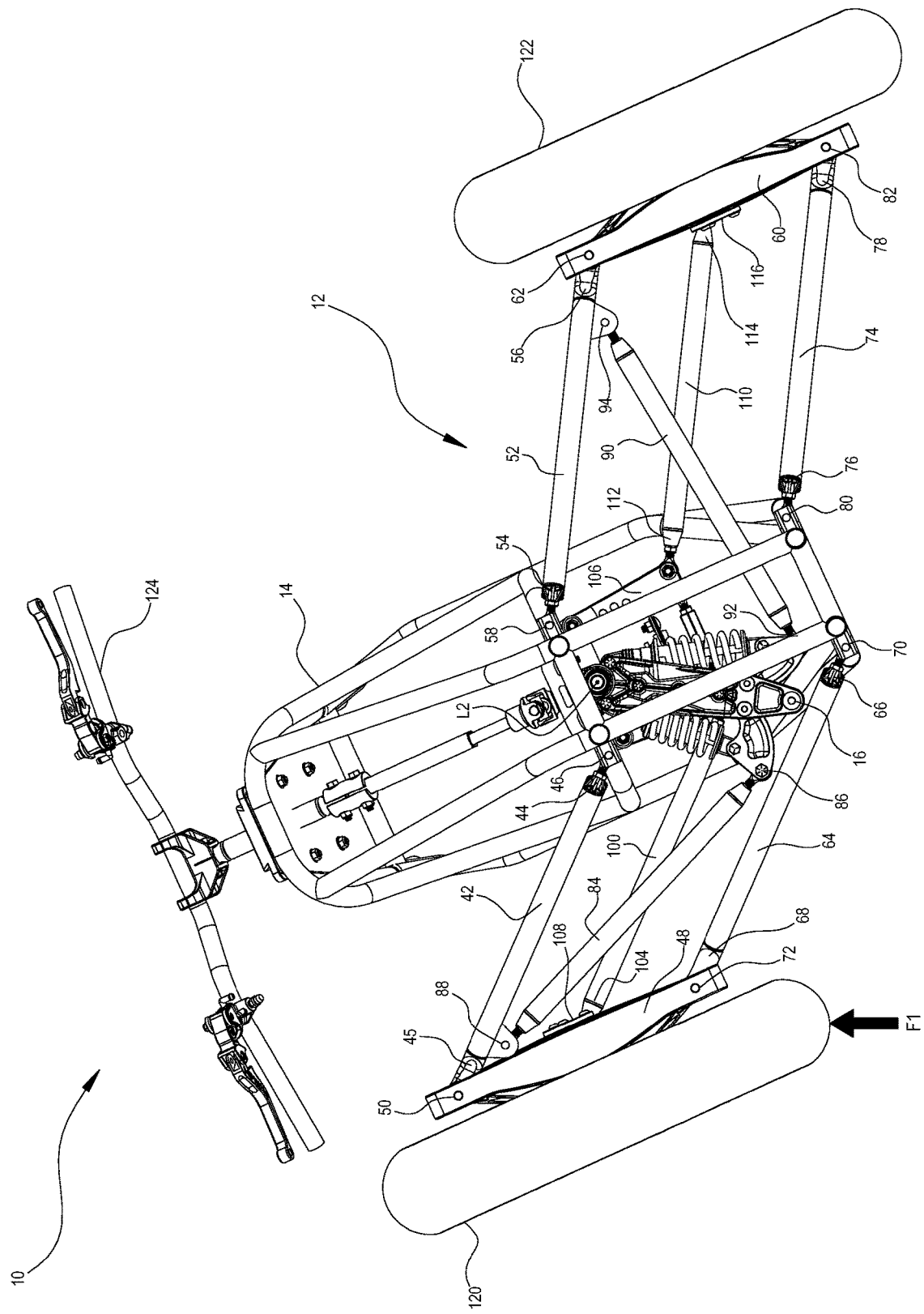
FIG. 11 is a front view of the FIG. 1A embodiment, in accordance herewith, the leaning vehicle shown in a leaning position while following a curved path and encountering an obstacle at the left wheel only.

Referring now to FIGS. 9-11, a front view of the FIG. 1 embodiment is presented showing the leaning vehicle 10 in a leaning position while following a curved path at a steady state. In FIG. 9, the leaning vehicle 10 is being leaned along the vehicle's longitudinal axis L1. In FIG. 10, the leaning vehicle 10 remains leaned about the same longitudinal axis, following a curved path, when it encounters and obstacle exerting forces F1 and F2 at both wheels 120 and 122. In FIG. 11 the leaning vehicle 10 remains leaned about the same longitudinal axis, following a curved path, when it encounters obstacle exerting force F1 at the first wheel 120, only.

As shown, the first wheel 120 and the second wheel 122 are steerable or adjustable about an axis created by the points 45, 56, 68, and 78 connecting the first and second uprights 48 and 60 to the pairs of upper connecting components 42 and 52 and lower connecting components 64 and 74. When frame 14 is leaned about an axis parallel to its longitudinal axis L1 and the ground plane, both the first wheel 120 and the second wheel 122 will lean to remain approximately parallel to a center plane of the central frame 14. This is the case for both the steerable suspension 12 and the non-steerable suspension 12' (see FIG. 1).

Still referring to FIGS. 9-11, as may be appreciated, the pivoting of the carrier assembly 16 and the lean of the frame 14 and the first and second wheels 120 and 122 are independent of the compression of the first spring and damper assembly 20 and the second spring and damper assembly 26 through the motion of the first bellcrank 30 and the second bellcrank 36 of the carrier assembly 16. Once again, this is the case for both the steerable suspension 12 and the non-steerable suspension 12' (see FIG. 1).

Referring to FIGS. 10 and 11, the first and second bellcranks 30 and 36 of the carrier assembly 16 are connected to the first and second suspension travel links 84 and 90, respectively, such that the first and second suspension travel links 84 and 90 are placed in tension when reacting to suspension loads from the first and second wheels 120 and 122. Likewise, the first and second bellcranks 30 and 36 of the carrier assembly 16 can be connected to the first and second suspension travel links 84 and 90, respectively, such that the first and second suspension travel links 84 and 90 are placed in compression when reacting to suspension loads from the first and second wheels 120 and 122 (not shown).

Figure 12:
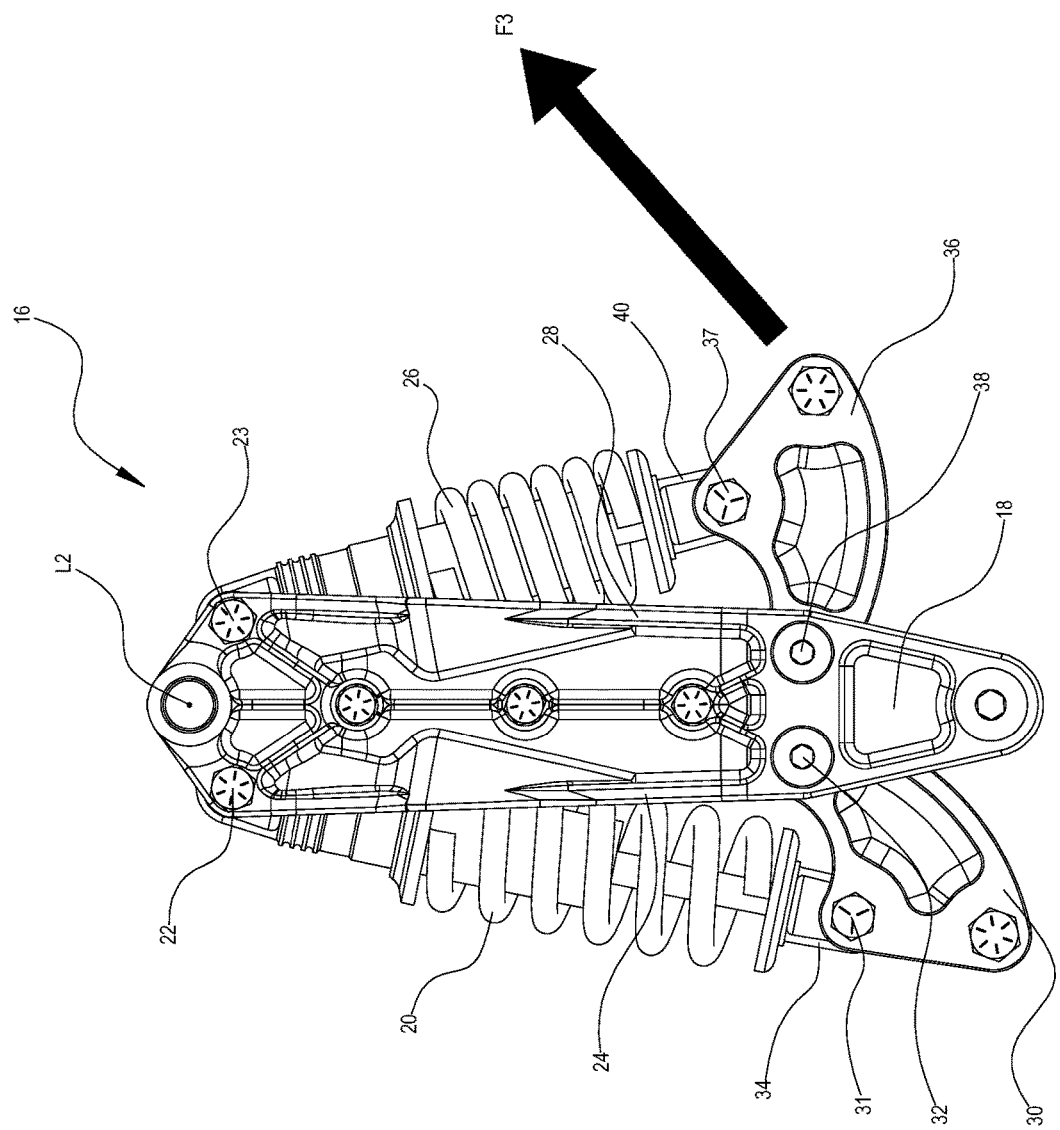
FIG. 12 is a perspective view of an embodiment of a pivoting carrier assembly for use with a pair of pullrods, in accordance herewith.
Figure 13:
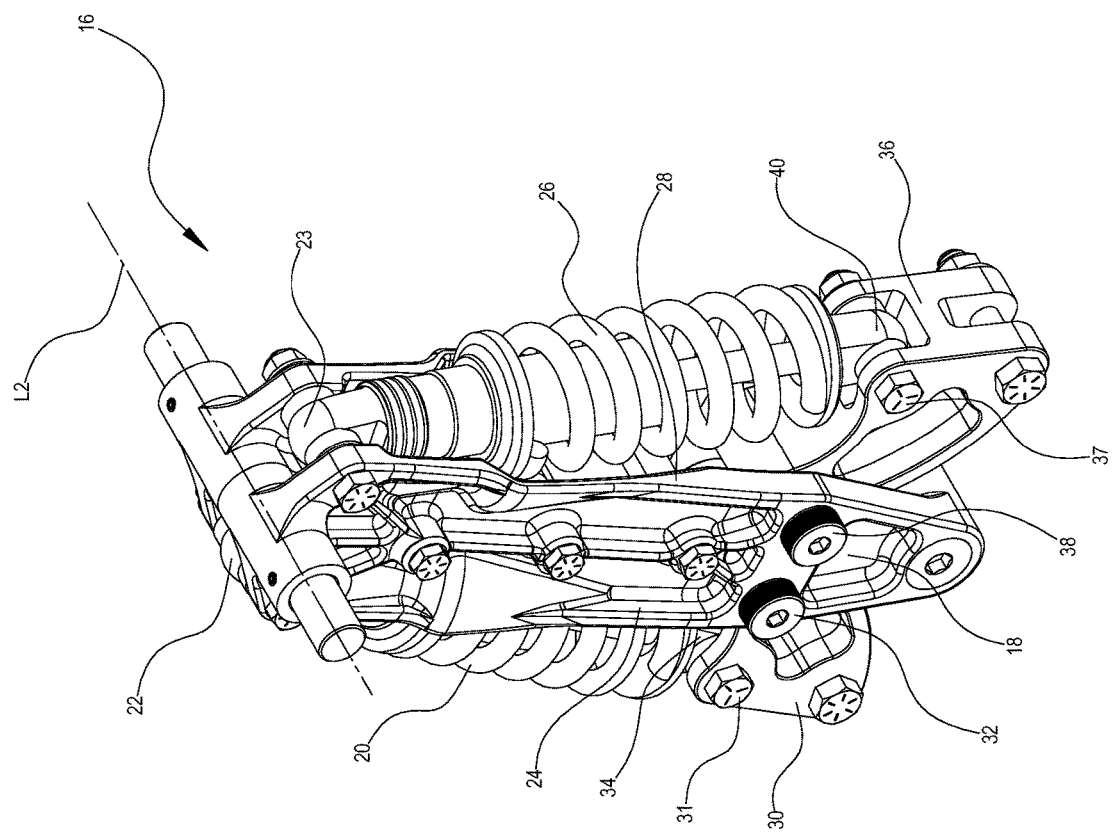
FIG. 13 is a front plan view of the pivoting carrier embodiment of FIG. 12 with the right bellcrank and spring and damper assembly actuated in response to a force acting on a wheel (not shown).

Referring now to FIGS. 12 and 13, views of an embodiment of a pivoting carrier assembly 16 for use with a pair of suspension travel links 84 and 90 placed in tension, or pullrods, is shown. As described above, the carrier assembly 16 includes a carrier body 18. First spring and damper assembly 20 is pivotably mounted to first side 24 of the carrier body 18 at first end 22. Second spring and damper assembly 26 is pivotably mounted to a second side 28 of the carrier body 18 at first end 23.

First bellcrank 30 is pivotably mounted to first side 24 of the carrier body 18 at second end 32. Second end 34 of first spring and damper assembly 20 is also mounted to first bellcrank 30 at mounting point 31. Second bellcrank 36 is pivotably mounted to second side 28 of the carrier body 18 at second end 38. Second end 40 of the second spring and damper assembly 26 is also mounted to the second bellcrank 36 at mounting point 37. As may be appreciated; when the first and second bellcranks, 30 and 36, respectively, are pivoted about their attaching axes the spring and damper assemblies 20 and 26 are compressed.

FIG. 13 is a front plan view of the pivoting carrier embodiment of FIG. 12 with a second bellcrank 36 and a second spring and damper assembly 26 actuated in response to a force acting on a second wheel (not shown). The detail of the change in the condition of the pivoting carrier assembly 16 during the encounter with the obstacle is shown in FIG. 13 where the increased force from the second wheel 122 (not shown) is represented by load arrow F3. The increased force causes second bellcrank 36 to rotate about the attachment point of second end 38 relative to carrier body 18, therefore compressing the second spring and damper assembly 26 to a shorter length, as shown, until a new force equilibrium is reached. As may be appreciated, in a case where both wheels 120 and 122 (not shown) encounter an obstacle, both spring and damper assemblies 20 and 26 would be compressed further as shown.

Figure 14:
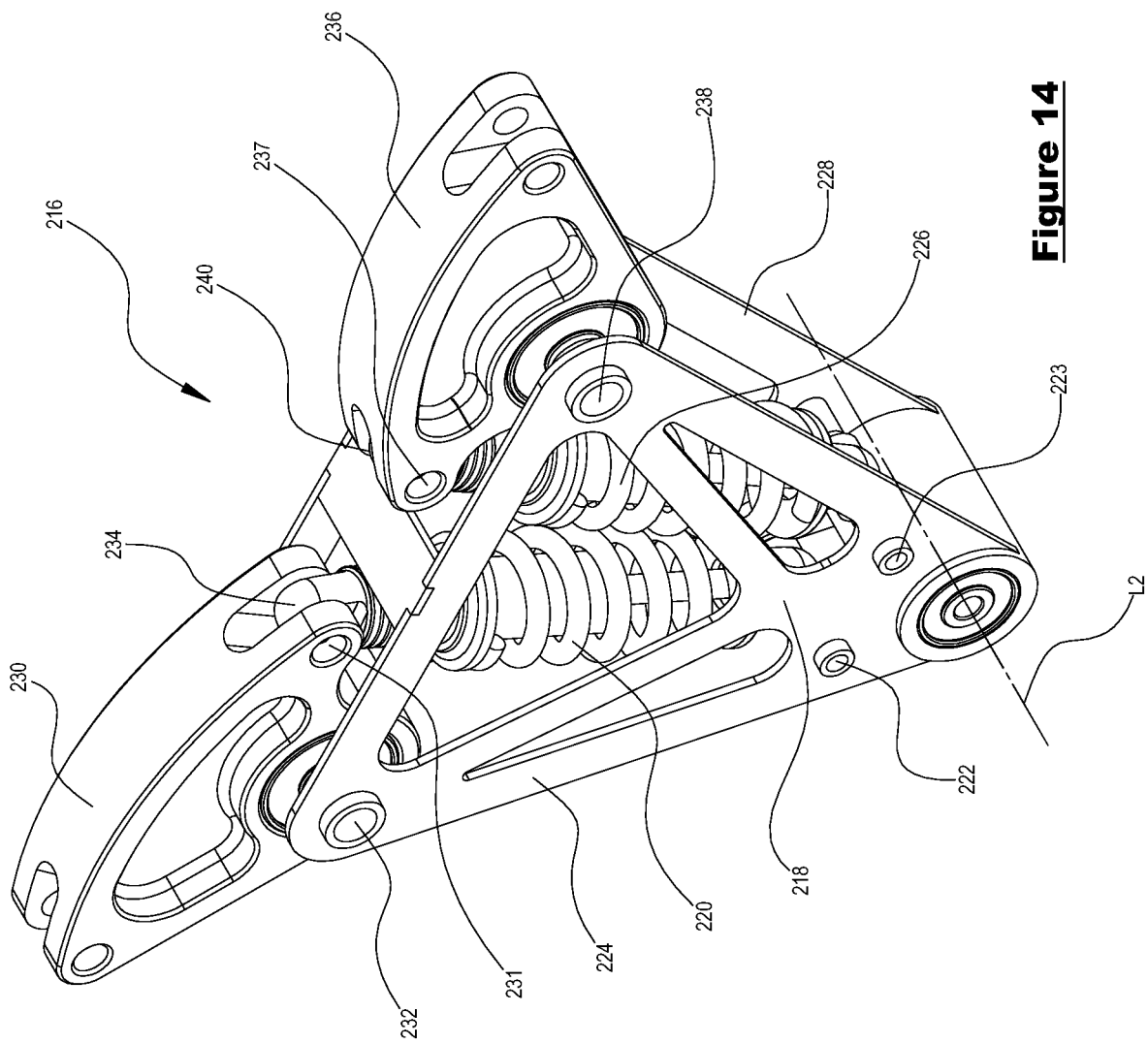
FIG. 14 is a perspective view of another embodiment of a pivoting carrier assembly for use with a pair of pushrods, in accordance herewith.
Figure 15:
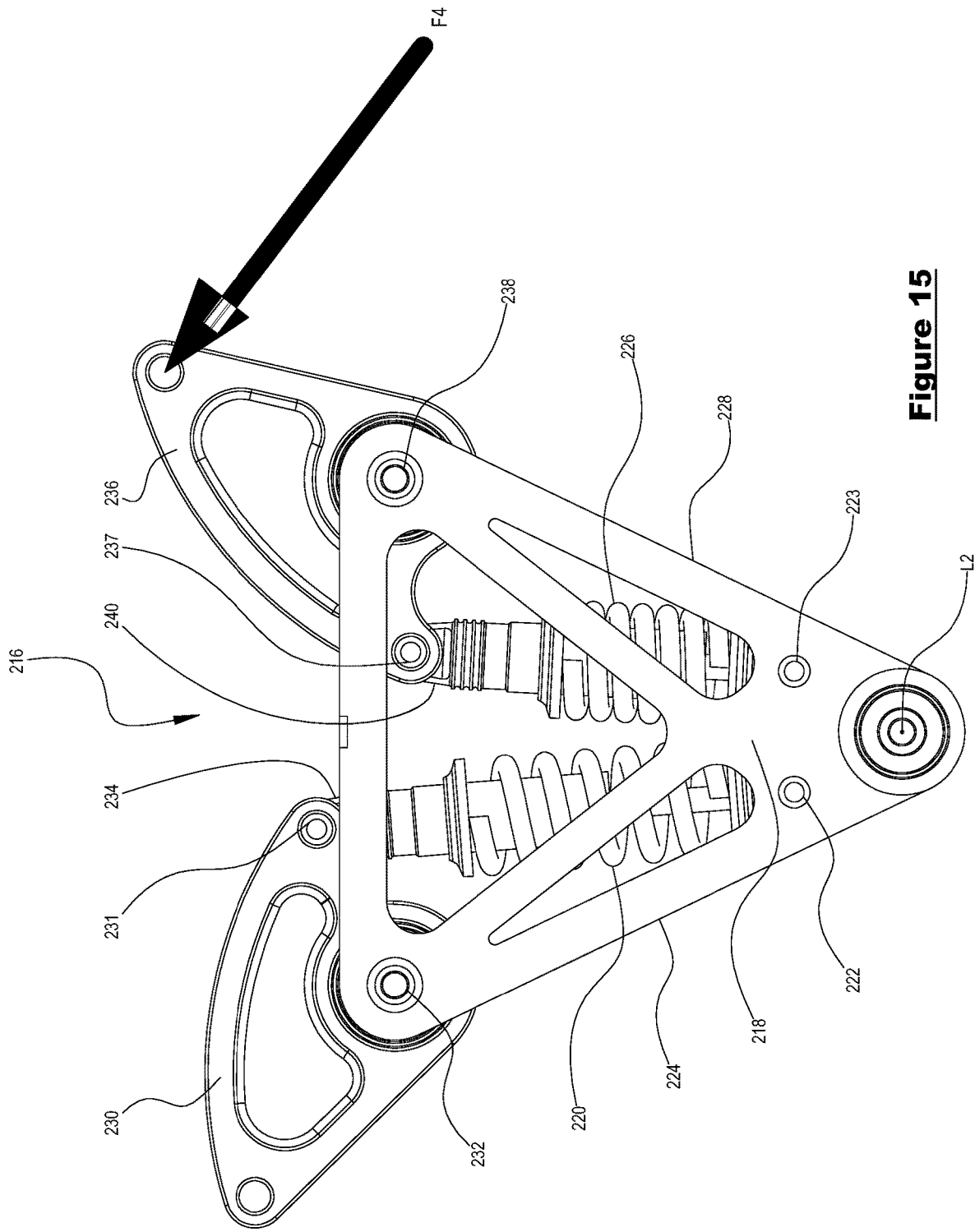
FIG. 15 is a front plan view of the pivoting carrier embodiment of FIG. 14 with the right bellcrank and spring and damper assembly actuated in response to a force acting on a wheel (not shown).

Referring now to FIGS. 14 and 15, views of an embodiment of a pivoting carrier assembly 216 for use with a pair of suspension travel links 84 and 90 placed in compression, or pushrods, is shown. As described above, the carrier assembly 216 includes a carrier body 218. First spring and damper assembly 220 is pivotably mounted to first side 224 of the carrier body 218 at first end 222. Second spring and damper assembly 226 is pivotably mounted to a second side 228 of the carrier body 218 at first end 223.

First bellcrank 230 is pivotably mounted to first side 224 of the carrier body 218 at second end 232. Second end 234 of first spring and damper assembly 220 is also mounted to first bellcrank 230 at mounting point 231. Second bellcrank 236 is pivotably mounted to second side 228 of the carrier body 218 at second end 238. Second end 240 of the second spring and damper assembly 226 is also mounted to the second bellcrank 236 at mounting point 237. As may be appreciated; when the first and second bellcranks, 230 and 236, respectively, are pivoted about their attaching axes the spring and damper assemblies 220 and 226 are compressed.

FIG. 15 is a front plan view of the pivoting carrier embodiment of FIG. 14 with a second bellcrank 236 and a second spring and damper assembly 226 actuated in response to a force acting on a second wheel (not shown). The detail of the change in the condition of the pivoting carrier assembly 216 during the encounter with the obstacle is shown in FIG. 15 where the increased force from the second wheel 122 (not shown) is represented by load arrow F4. The increased force causes second bellcrank 236 to rotate about the attachment point of second end 238 relative to carrier body 218, therefore compressing the second spring and damper assembly 226 to a shorter length, as shown, until a new force equilibrium is reached. As may be appreciated, in a case where both wheels 120 and 122 (not shown) encounter an obstacle, both spring and damper assemblies 220 and 226 would be compressed further as shown.

The characteristics of the leaning vehicle 10 that allow the rider to accurately control the lean of leaning vehicle 10 and the trajectory around a corner are determined by the geometry selection of each of the components described above. The decision for the exact geometries that make a functional vehicle using the suspension systems disclosed herein can be guided by the same principles that govern the functionality of any two-wheeled vehicle, which can be easily understood by anyone with skill in that subject and so will not be described in detail here.

Figure 16:
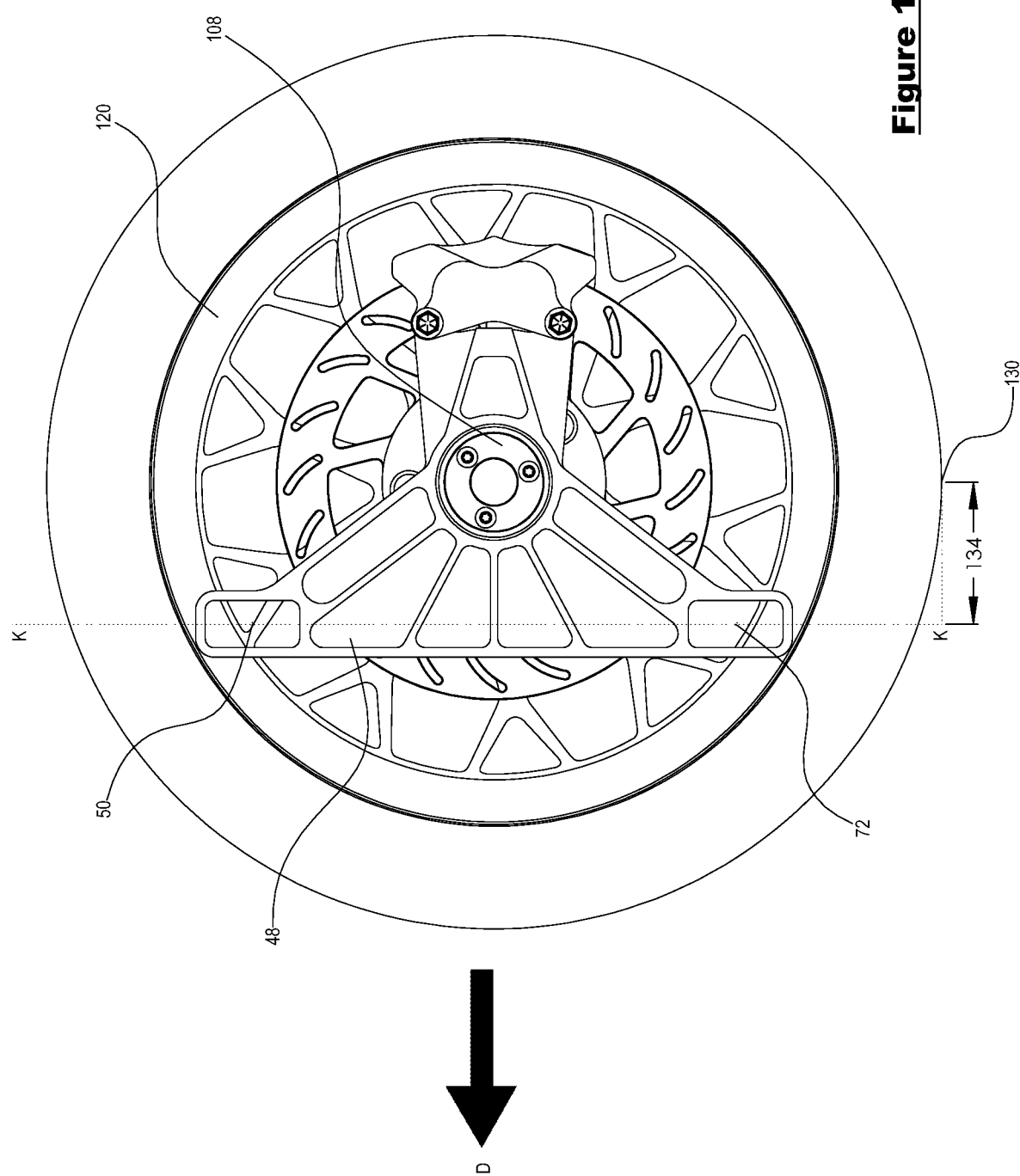
FIG. 16 is a side view of an embodiment of the directionally controllable wheel and attachment mechanism, showing a disc brake as part of the assembly, in accordance herewith.

Referring now to FIGS. 2 and 16, a critical characteristic that differentiates most two-wheeled vehicles from the present disclosure is the fact that the steerable wheels 120 and 122 are not likely to have their center plane coincident with the axis about which they are steered, or kingpin axis K. The distance between the kingpin axis K and the tire contact point 130 from the front view of the vehicle is commonly known as the scrub radius and is shown by distance 132. In most cases of vehicles with three or more wheels, the kingpin axis K is at a small angle from perpendicular to the ground plane. However, in most two-wheeled vehicles that angle is frequently quite large to create the mechanical trail represented by distance 134 required to create the up-righting moment that stabilizes the vehicle when traveling along a straight path. This larger angle is normally referred to as the rake angle of two-wheeled vehicle front suspension forks.

In the case where both a large mechanical trail distance 134 and a non-zero scrub radius 132 are required to create the up-righting moment required and allow the design of the suspension components to not be excessively complex or costly, a selection of kingpin angles of anything other than near zero (or vertical) will create large steering jacking forces. Since the compression of spring and damper assemblies 20 and 26 are decoupled from the lean of the vehicle by allowing the carrier assembly 16 to pivot about axis L2, these steering jacking forces substantially destabilize the vehicle and create a situation that is extremely difficult for the rider to control. Therefore, it is advantageous to select a kingpin angle that is substantially near 0 degrees, making the kingpin axis K approximately perpendicular to the ground while the vehicle is travelling along a linear path with respect to the center-plane of frame 14. Instead of using a high rake angle, the mechanical trail 134 required to create the required up-righting moment is created by shifting the contact patch 130 of the steerable tire and wheel backwards from the approximately vertical kingpin axis K with respect to the direction of travel D of the leaning vehicle 10 by the trail amount required 134. As shown in FIGS. 2 and 16, these geometrical parameters can be accomplished with no extraordinary design or manufacturing requirements.

A wheel mounting component 108 for rotatably mounting a wheel 120 of a leaning vehicle to its suspension components via upright 48 is provided. As may be appreciated, the axis about which the wheel mounting component 108 can rotate relative to the frame 14 is approximately parallel to the ground and perpendicular to kingpin axis K when a leaning vehicle 10 is travelling along a straight path. As mentioned above, the point at which a tire of the wheel 120 contacts the ground 130 is substantially rearward from the interception point of the axis K about which the wheel mounting component 108 can rotate with respect to the forward direction of motion D of the leaning vehicle 10.

In another embodiment, for the wheel mounting component 108 and upright 48, the point at which the tire contacts the ground 130 is coincident with the intersection point between the axis K about which the upright 48 is steered and the ground when viewed from the front of the leaning vehicle 10 while it is travelling along a straight path (not shown).

Figure 17:
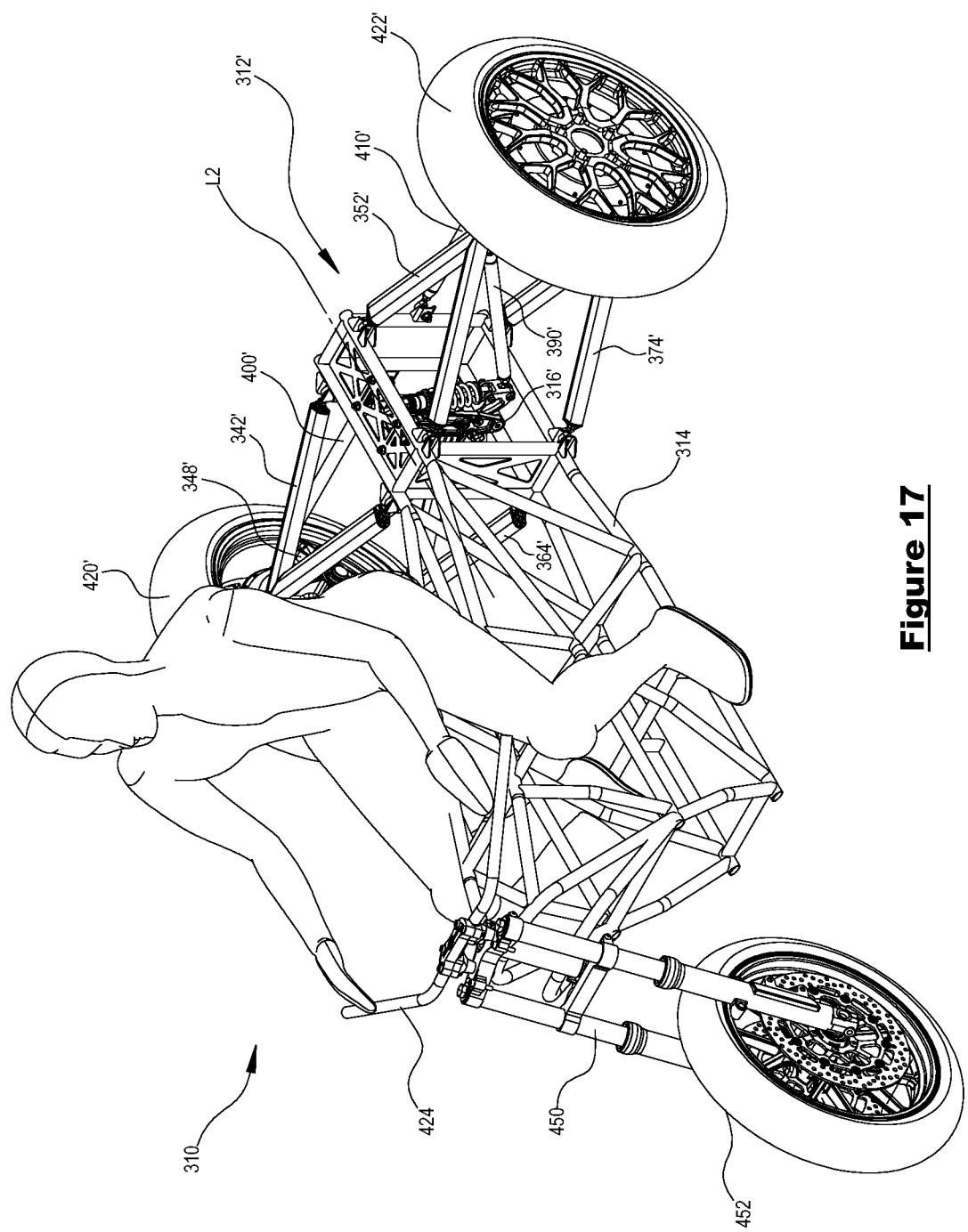
FIG. 17 is a perspective view of one embodiment of a three-wheeled leaning vehicle having a suspension in accordance herewith adjacent to the rear of the vehicle.

Referring now to FIG. 17, a perspective view of one embodiment of a three-wheeled leaning vehicle 310 having a suspension 312' is presented. As shown, the first and second wheels 420' and 422' are adjacent the rear of the leaning vehicle 310. A third wheel 452 is held in place by fork 450, adjacent the front of the leaning vehicle 310.

As shown, the suspension 312' includes carrier assembly 316' pivotably attached about a second longitudinal axis L2 of the central frame 314. (For more detail, see FIGS. 12 and 13).

Still referring to FIG. 17, a pair of first upper connecting components 342' are provided. A pair of second upper connecting components 352', are also provided. A pair of first lower connecting components 364', and a pair of second lower connecting components 374', are provided. As is within the scope of the present disclosure, the pairs of upper and lower connecting components may be joined at an apex thereof to form singular first connecting components 342' and 352' and second lower connecting components 364' and 374'.

First suspension travel link 384' (not shown) is connected to the first bellcrank 330' and either the first uprights 348' (not shown) or the pair of first upper connecting components 342' (as shown), or the pair of first lower connecting components 364'(not shown). Second suspension travel link 390' is connected to the second bellcrank 336' and either the second upright 360' (not shown), or the pair of second upper connecting components 352' (as shown), or the pair of second lower connecting components 374' (not shown).

Figure 18:
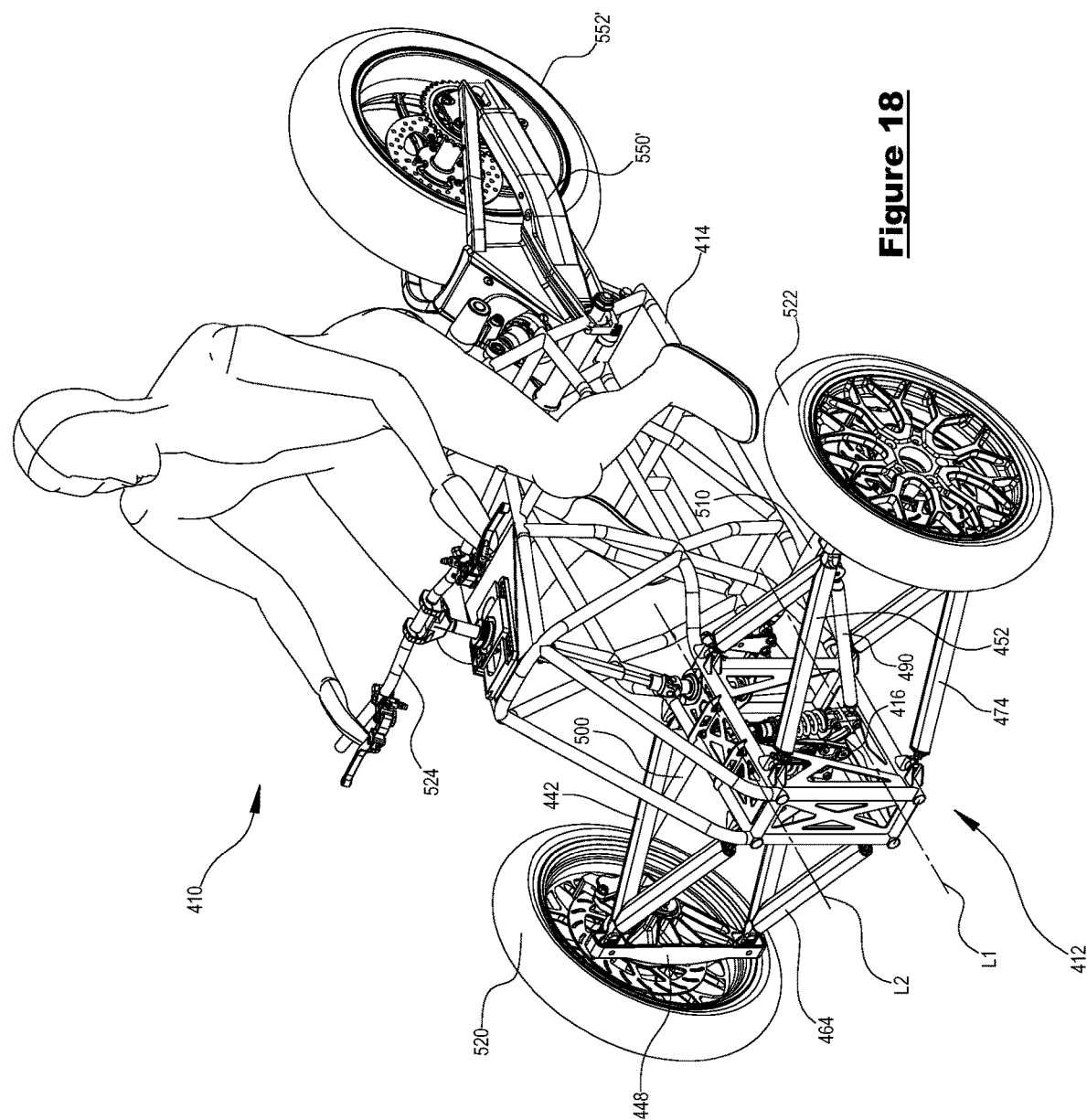
FIG. 18 is a perspective view of another embodiment of a three-wheeled leaning vehicle having a suspension in accordance herewith adjacent to the front of the vehicle.

FIG. 18 is a perspective view of another embodiment of a three-wheeled leaning vehicle 410 having a suspension 412 in accordance herewith. In the FIG. 18 embodiment, the first and second wheels 520 and 522 are positioned adjacent the front of the leaning vehicle 410. In this embodiment, a third wheel 552' is positioned adjacent the rear of the leaning vehicle 410. The third wheel 552' is held in place by swing arm assembly 550'.

Still referring to FIG. 18, As shown, the suspension 412 includes carrier assembly 416 pivotably attached about a second longitudinal axis L2 of the central frame 414. (For more detail, see FIGS. 14 and 15).

A pair of first upper connecting components 442 are provided. A pair of second upper connecting components 452 are also provided.

A pair of first lower connecting components 464, and a pair of second lower connecting components 474, are provided. As is within the scope of the present disclosure, the pairs of upper and lower connecting components may be joined at an apex thereof to form singular first and second upper connecting components 442 and 452 and singular lower connecting components 464 and 474.

First suspension travel link 484 (not shown) is connected to the first bellcrank 430 and either the first uprights 448 (not shown), or the pair of first upper connecting components 442 (as shown), or the pair of first lower connecting component 464 (not shown). Second suspension travel link 490 is connected to the second bellcrank 436 and either the second upright 460 (not shown), or the pair of second upper connecting components 452 (as shown), or the pair of second lower connecting components 474 (not shown).

In some embodiments, the suspension is located adjacent both the front and the rear of the vehicle. In some embodiments, three or more suspensions are positioned in any location of the vehicle.

Figure 19:
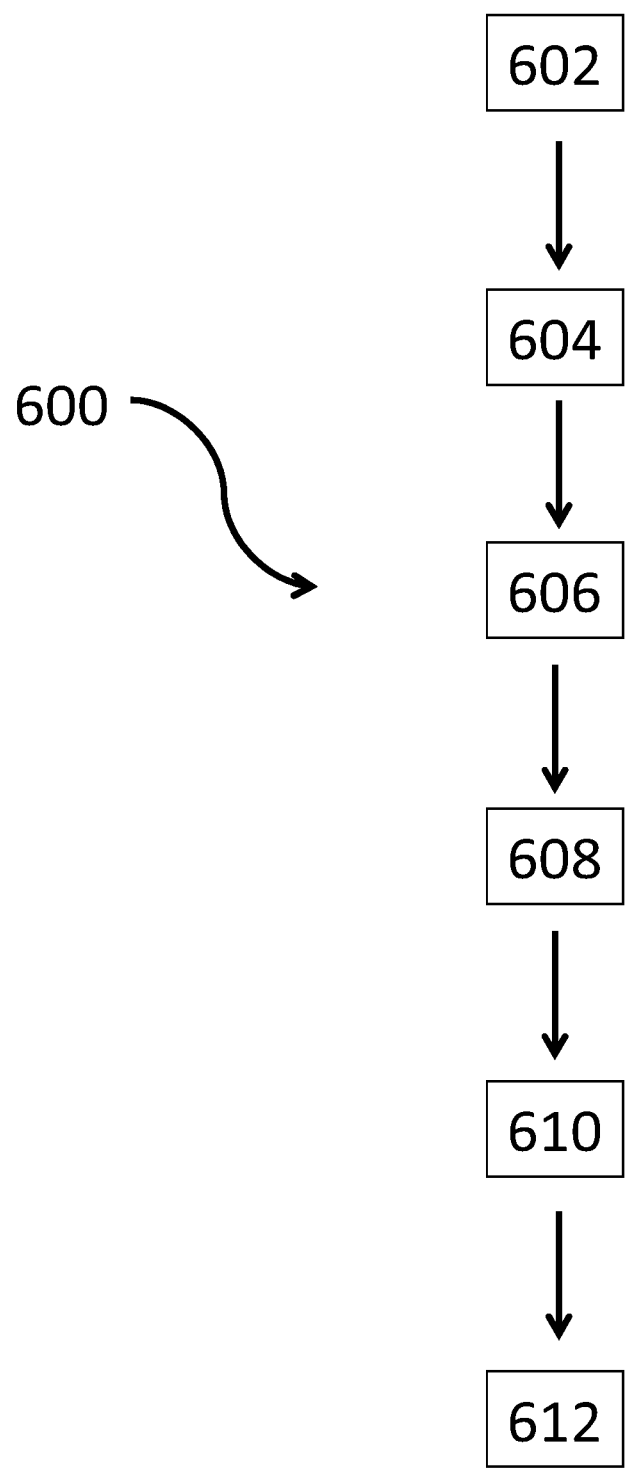
FIG. 19 is a block diagram presenting one embodiment of a method in accordance herewith.

Referring to FIG. 19, a block diagram of a method 600 of forming a suspension for a leaning vehicle having a central frame from a set of components, the central frame having a first longitudinal axis is presented. The method 600 includes the steps of 602, providing a carrier assembly pivotably attached about a second longitudinal axis to the frame, the carrier assembly including a carrier body; i) a first spring and damper assembly pivotably mounted to a first side of the carrier body at a first end thereof; ii) a second spring and damper assembly pivotably mounted to a second side of the carrier body at a first end thereof; iii) a first bellcrank pivotably mounted to a first side of the carrier body at a second end thereof, the second end of the first spring and damper assembly also mounted to the first bellcrank and; iv) a second bellcrank pivotably mounted to a second side of the carrier body at a second end thereof, the second end of the second spring and damper assembly also mounted to the second bellcrank; wherein when the first and second bellcranks are pivoted about their attaching axis the spring and damper assemblies are compressed.

The method 600 also includes the step of 604, providing a pair of first upper connecting components, each first upper connecting component having a first end and a second end, the first end connected to a first upper connecting axis link, the second end connected to a first upright at an upper end thereof, and a pair of second upper connecting components, each second upper connecting component having a first end and a second end, the first end connected to a second upper connecting axis link, the second end connected to a second upright at an upper end thereof.

Further, the method 600 also includes the step of 606, providing a pair of first lower connecting components, each first lower connecting component having a first end and a second end, the first end connected to a first lower connecting axis link, the second end connected to a first upright at an lower end thereof, and a pair of second lower connecting components, each second lower connecting component having a first end and a second end, the first end connected to a second lower connecting axis link, the second end connected to a second upright at an lower end thereof.

The method 600 additionally includes the step of 608, providing a first suspension travel link having a first end and a second end, the first end connected to the first bellcrank and the second end connected to either the first upright, or the pair of first upper connecting components, or the pair of first lower connecting components, and a second suspension travel link having a first end and a second end, the first end connected to the second bellcrank and the second end connected to either the second upright, or the pair of second upper connecting components, or the pair of second lower connecting components.

The method 600 finally includes the step 610, assembling the above components to form the suspension for a leaning vehicle.

In some embodiments, the method 600 further includes the step 612, providing a first steering link having a first end and a second end, the first end connected to a steering control assembly, the second end connected to a first upright, and a second steering link having a first end and a second end, the first end connected to a steering control assembly, the second end connected to a second upright.

In the present disclosure, several of the illustrative, non-exclusive examples have been discussed and/or presented in the context of the Figures and in the case of the method, in the context of the block diagram. Unless specifically set forth in the accompanying description, it is within the scope of the present disclosure that the order of the blocks may vary from the illustrated order in, including with two or more of the blocks (or steps) occurring in a different order and/or concurrently.

As used herein, the term "and/or" placed between a first entity and a second entity means one of (1) the first entity, (2) the second entity, and (3) the first entity and the second entity. Multiple entities listed with "and/or" should be construed in the same manner, i.e., "one or more" of the entities so conjoined. Other entities may optionally be present other than the entities specifically identified by the "and/or" clause, whether related or unrelated to those entities specifically identified. Thus, as a non-limiting example, a reference to "A and/or B," when used in conjunction with open-ended language such as "comprising" may refer, in one embodiment, to A only (optionally including entities other than B); in another embodiment, to B only (optionally including entities other than A); in yet another embodiment, to both A and B (optionally including other entities). These entities may refer to elements, actions, structures, steps, operations, values, and the like.

As used herein, the phrase "at least one," in reference to a list of one or more entities should be understood to mean at least one entity selected from any one or more of the entities in the list of entities, but not necessarily including at least one of each and every entity specifically listed within the list of entities and not excluding any combinations of entities in the list of entities. This definition also allows that entities may optionally be present other than the entities specifically identified within the list of entities to which the phrase "at least one" refers, whether related or unrelated to those entities specifically identified. Thus, as a non-limiting example, "at least one of A and B" (or, equivalently, "at least one of A or B," or, equivalently "at least one of A and/or B") may refer, in one embodiment, to at least one, optionally including more than one, A, with no B present (and optionally including entities other than B); in another embodiment, to at least one, optionally including more than one, B, with no A present (and optionally including entities other than A); in yet another embodiment, to at least one, optionally including more than one, A, and at least one, optionally including more than one, B (and optionally including other entities). In other words, the phrases "at least one," "one or more," and "and/or" are open-ended expressions that are both conjunctive and disjunctive in operation. For example, each of the expressions "at least one of A, B and C," "at least one of A, B, or C," "one or more of A, B, and C," "one or more of A, B, or C" and "A, B, and/or C" may mean A alone, B alone, C alone, A and B together, A and C together, B and C together, A, B and C together, and optionally any of the above in combination with at least one other entity.

In the event that any patents, patent applications, or other references are incorporated by reference herein and define a term in a manner or are otherwise inconsistent with either the non-incorporated portion of the present disclosure or with any of the other incorporated references, the non-incorporated portion of the present disclosure shall control, and the term or incorporated disclosure therein shall only control with respect to the reference in which the term is defined and/or the incorporated disclosure was originally present.

As used herein the terms "adapted" and "configured" mean that the element, component, or other subject matter is designed and/or intended to perform a given function. Thus, the use of the terms "adapted" and "configured" should not be construed to mean that a given element, component, or other subject matter is simply "capable of" performing a given function but that the element, component, and/or other subject matter is specifically selected, created, implemented, utilized, programmed, and/or designed for the purpose of performing the function. It is also within the scope of the present disclosure that elements, components, and/or other recited subject matter that is recited as being adapted to perform a particular function may additionally or alternatively be described as being configured to perform that function, and vice versa.

INDUSTRIAL APPLICABILITY

The systems and methods disclosed herein are applicable to the mobility and automotive industries.

It is believed that the disclosure set forth above encompasses multiple distinct inventions with independent utility. While each of these inventions has been disclosed in its preferred form, the specific embodiments thereof as disclosed and illustrated herein are not to be considered in a limiting sense as numerous variations are possible. The subject matter of the inventions includes all novel and non-obvious combinations and subcombinations of the various elements, features, functions and/or properties disclosed herein. Similarly, where the claims recite "a" or "a first"

element or the equivalent thereof, such claims should be understood to include incorporation of one or more such elements, neither requiring nor excluding two or more such elements.

It is believed that the following claims particularly point out certain combinations and subcombinations that are directed to one of the disclosed inventions and are novel and non-obvious. Inventions embodied in other combinations and subcombinations of features, functions, elements and/or properties may be claimed through amendment of the present claims or presentation of new claims in this or a related application. Such amended or new claims, whether they are directed to a different invention or directed to the same invention, whether different, broader, narrower, or equal in scope to the original claims, are also regarded as included within the subject matter of the inventions of the present disclosure.

The invention claimed is:

1. A suspension for a leaning vehicle having a central frame, the central frame having a first longitudinal axis, comprising:
   a) a carrier assembly pivotably attached about a second longitudinal axis to the central frame, the carrier assembly including a carrier body;
      i) a first spring and damper assembly with first and second ends pivotably mounted to a first side of the carrier body at a first end thereof;
      ii) a second spring and damper assembly with first and second ends, pivotably mounted to a second side of the carrier body at a first end thereof;
      iii) a first bellcrank pivotably mounted to a first side of the carrier body at a second end thereof, the second end of the first spring and damper assembly also mounted to the first bellcrank; and
      iv) a second bellcrank pivotably mounted to a second side of the carrier body at a second end thereof, the second end of the second spring and damper assembly also mounted to the second bellcrank;
   wherein the first and second bellcranks are pivoted about their attaching axes when the spring and damper assemblies are compressed;
   b) a pair of first upper connecting components, each first upper connecting component having a first end and a second end, the first end connected to a first upper connecting axis link on the central frame, the second end connected to a first upright at an upper end thereof, and a pair of second upper connecting components, each second upper connecting component having a first end and a second end, the first end connected to a second upper connecting axis link on the central frame, the second end connected to a second upright at an upper end thereof;
   c) a pair of first lower connecting components, each first lower connecting component having a first end and a second end, the first end connected to a first lower connecting axis link on the central frame, the second end connected to a first upright at a lower end thereof, and a pair of second lower connecting components, each second lower connecting component having a first end and a second end, the first end connected to a second lower connecting axis link on the central frame, the second end connected to a second upright at a lower end thereof;
   d) a first suspension travel link having a first end and a second end, the first end connected to the first bellcrank and the second end connected to either the first upright, or the pair of first upper connecting components, or the pair of first lower connecting components, and a second suspension travel link having a first end and a second end, the first end connected to the second bellcrank and the second end connected to either the second upright, or the pair of second upper connecting components, or the pair of second lower connecting components;
   e) a first steering link having a first end and a second end, the first end connected to a steering control assembly and the second end connected to the first upright, and a second steering link having a first end and a second end, the first end connected to a steering control assembly, the second end connected to the second upright; and
   f) a first wheel and tire assembly, the first wheel and tire assembly rotatably mounted to the first upright by a first wheel mounting component, and a second wheel and tire assembly, the second wheel and tire assembly rotatably mounted to the second upright by a second wheel mounting component.

2. The suspension of claim 1, wherein the steering control assembly is steerable by a rider, thereby allowing the rider to steer the first and second wheels relative to the central frame about an axis created by the second ends of each left and right pairs of upper and lower connecting components.

3. The suspension of claim 2, wherein when an upward force is exerted on either the first or second wheel or both of the first and second wheels, the first and/or second suspension travel link from the first and/or second wheel rotates the corresponding bellcrank and compresses the corresponding first and/or second spring and damper assembly, allowing independent suspension actuation regardless of the pivoted location of the carrier assembly about its pivotable axis.

4. The suspension of claim 2, wherein if the central frame is leaned about an axis parallel to the first longitudinal axis and the ground plane, both the first and second wheels will lean to remain approximately parallel to a center plane of the central frame.

5. The suspension of claim 2, wherein the pivoting of the carrier assembly and the lean of the central frame and the first and second wheels are independent of the compression of the first and second spring and damper assemblies through the motion of the first and second bellcranks of the carrier assembly.

6. The suspension of claim 2, wherein the leaning vehicle can lean during cornering while not compressing the first and second spring and damper assemblies from the leaning action while maintaining independent suspension travel at each of the first and second wheels.

7. The suspension of claim 2, wherein the first and second bellcranks of the carrier assembly are connected to the first and second suspension travel links, respectively, such that the first and second suspension travel links are placed in tension when reacting to suspension loads from the first and second wheels.

8. The suspension of claim 2, wherein the first and second bellcranks of the carrier assembly are connected to the first and second suspension travel links, respectively, such that the first and second suspension travel links are placed in compression when reacting to suspension loads from the first and second wheels.

9. A leaning vehicle having the suspension of claim 2, wherein the first and second wheels are positioned adjacent the front of the leaning vehicle, further comprising a third wheel positioned adjacent the rear of the vehicle.

10. The suspension of claim 1, wherein the steering control assembly is set at a fixed and/or adjustable position, thereby maintaining a fixed steering angle relative to the central frame about an axis created by the second ends of each left and right pairs of upper and lower connecting components.

11. The suspension of claim 10, wherein when an upward force is exerted on either the first or second wheel or both of the first and second wheels, the first and/or second suspension travel link from the first and/or second wheel rotates the corresponding bellcrank and compresses the corresponding first and/or second spring and damper assembly, allowing independent suspension actuation regardless of the pivoted location of the carrier assembly about its pivotable axis.

12. The suspension of claim 10, wherein if the central frame is leaned about an axis parallel to the first longitudinal axis and the ground plane, both the first and second wheels will lean to remain approximately parallel to a center plane of the central frame.

13. The suspension of claim 10, wherein the pivoting of the carrier assembly and the lean of the central frame and the first and second wheels are independent of the compression of the first and second spring and damper assemblies through the motion of the first and second bellcranks of the carrier assembly.

14. The suspension of claim 10, wherein the leaning vehicle can lean during cornering while not compressing the first and second spring and damper assemblies from the leaning action while maintaining independent suspension travel at each of the first and second wheels.

15. The suspension of claim 10, wherein the first and second bellcranks of the carrier assembly are connected to the first and second suspension travel links, respectively, such that the first and second suspension travel links are placed in tension when reacting to suspension loads from the first and second wheels.

16. The suspension of claim 10, wherein the first and second bellcranks of the carrier assembly are connected to the first and second suspension travel links, respectively, such that the first and second suspension travel links are placed in compression when reacting to suspension loads from the first and second wheels.

17. A leaning vehicle having the suspension of claim 10, wherein the first and second wheels are adjacent the rear of the vehicle, further comprising a third wheel adjacent the front of the vehicle.

18. The suspension of claim 1, wherein at least one of the pairs of first upper connecting components, and/or pair of second upper connecting components, and/or pair of first lower connecting components, and/or pair of second lower connecting components are joined at their second ends to form unitary connecting components.

19. A leaning vehicle having the suspension of claim 1, wherein the suspension is located adjacent both the front and the rear of the vehicle.

20. An upright to provide a connection to a wheel mounting component for rotatably mounting a wheel and tire of a leaning vehicle, the upright connected to a central frame by an upper connecting component and a lower connecting component, wherein:
   a) the upper connecting component has a first end and a second end, the first end connected to an upper connecting axis link on the central frame, the second end connected to the upright at an upper end thereof,
   b) the lower connecting component has a first end and a second end, the first end connected to a lower connecting axis link on the central frame, the second end connected to the upright at a lower end thereof,
   wherein a theoretical axis is created by the intersecting line between the second end of the upper connecting component at the upper end of the upright and the second end of the lower connecting component at the lower end of the upright, and a contact point between the road surface and the tire can be observed
   c) the upright shaped so that the theoretical axis is approximately perpendicular to the ground when the vehicle is traveling along a straight path
   d) the wheel mounting component positioned within the upright such that the contact point between the road surface and the tire is substantially rearward from the theoretical axis with respect to the forward direction of motion of the leaning vehicle.

21. The upright of claim 20, wherein the upright can be rotated about the theoretical axis relative to the upper connecting component and lower connecting component by a steering control system.

22. The upright of claim 20, wherein the rotation of the upright about the theoretical axis is set at a fixed and/or adjustable position, thereby maintaining a fixed steering angle relative to the central frame.

23. A method of forming a suspension for a leaning vehicle having a central frame from a set of components, the central frame having a first longitudinal axis, the method comprising:
   a) providing a carrier assembly pivotably attached about a second longitudinal axis to the central frame, the carrier assembly including a carrier body; i) a first spring and damper assembly pivotably mounted to a first side of the carrier body at a first end thereof; ii) a second spring and damper assembly pivotably mounted to a second side of the carrier body at a first end thereof; iii) a first bellcrank pivotably mounted to a first side of the carrier body at a second end thereof, the second end of the first spring and damper assembly also mounted to the first bellcrank and; iv) a second bellcrank pivotably mounted to a second side of the carrier body at a second end thereof, the second end of the second spring and damper assembly also mounted to the second bellcrank; wherein when the first and second bellcranks are pivoted about their attaching axis the spring and damper assemblies are compressed;
   b) providing a pair of first upper connecting components, each first upper connecting component having a first end and a second end, the first end connected to a first upper connecting axis link, the second end connected to a first upright at an upper end thereof, and a pair of second upper connecting components, each second upper connecting component having a first end and a second end, the first end connected to a second upper connecting axis link, the second end connected to a second upright at an upper end thereof;
   c) providing a pair of first lower connecting components, each first lower connecting component having a first end and a second end, the first end connected to a first lower connecting axis link, the second end connected to a first upright at an lower end thereof, and a pair of second lower connecting components, each second lower connecting component having a first end and a second end, the first end connected to a second lower connecting axis link, the second end connected to a second upright at an lower end thereof;
   d) providing a first suspension travel link having a first end and a second end, the first end connected to the first bellcrank and the second end connected to either the first upright, or the pair of first upper connecting components, or the pair of first lower components, and a second suspension travel link having a first end and a second end, the first end connected to the second bellcrank and the second end connected to either the second upright, or the pair of second upper connecting components, or the pair of second lower connecting components; and e) assembling a) through d) to form the suspension for a leaning vehicle.

24. The method of claim 23, further comprising the step of a providing a first steering link having a first end and a second end, the first end connected to a steering control assembly, the second end connected to a first upright, and a second steering link having a first end and a second end, the first end connected to a steering control assembly, the second end connected to a second upright.

25. A carrier assembly for use in a suspension for a leaning vehicle having a central frame having a first longitudinal axis, the carrier assembly pivotably attached about a second longitudinal axis to the central frame, the leaning vehicle structured and arranged to be driven by a rider, the carrier assembly including a carrier body, comprising;

i) a first spring and damper assembly pivotably mounted to a first side of the carrier body at a first end thereof;

ii) a second spring and damper assembly pivotably mounted to a second side of the carrier body at a first end thereof;

iii) a first bellcrank pivotably mounted to a first side of the carrier body at a second end thereof, the second end of the first spring and damper assembly also mounted to the first bellcrank; and iv) a second bellcrank pivotably mounted to a second side of the carrier body at a second end thereof, the second end of the second spring and damper assembly also mounted to the second bellcrank;

wherein the first and second bellcranks are pivoted about their attaching axes when the spring and damper assemblies are compressed.

* * * * *